United States Patent
Robinson

(10) Patent No.: US 11,159,220 B2
(45) Date of Patent: Oct. 26, 2021

(54) SINGLE INPUT SINGLE OUTPUT (SISO) PHYSICAL LAYER KEY EXCHANGE

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

(*) Notice: Subject to any disclaimer, the term of this patent is extended or adjusted under 35 U.S.C. 154(b) by 0 days.

(21) Appl. No.: 16/787,290

(22) Filed: Feb. 11, 2020

(65) Prior Publication Data

US 2021/0250075 A1    Aug. 12, 2021

(51) Int. Cl.
*H03D 3/22* (2006.01)
*H04B 7/06* (2006.01)
(Continued)

(52) U.S. Cl.
CPC ......... *H04B 7/0634* (2013.01); *H04B 7/0417* (2013.01); *H04B 7/0456* (2013.01); *H04B 7/0639* (2013.01)

(58) Field of Classification Search
CPC .. H04B 7/0634; H04B 7/0417; H04B 7/0456; H04B 7/0639
(Continued)

(56) References Cited

U.S. PATENT DOCUMENTS

| | | | |
|---|---|---|---|
| 5,237,587 A | 8/1993 | Schoolcraft | |
| 5,345,599 A | 9/1994 | Paulraj et al. | |

(Continued)

FOREIGN PATENT DOCUMENTS

| | | |
|---|---|---|
| CN | 1813435 A | 8/2006 |
| CN | 101179539 A | 5/2008 |

(Continued)

OTHER PUBLICATIONS

Huang et al., "Multi-dimensional encryption scheme based on physical layer for fading channel," IET Communications, Oct. 2018, vol. 12, Issue 19, pp. 2470-2477.
(Continued)

*Primary Examiner* — Zewdu A Kassa
(74) *Attorney, Agent, or Firm* — Cooley LLP

(57) ABSTRACT

A processor coupled to a first communication device produces and transmits a first encoded vector and a second encoded vector to a second communication device via a communication channel that applies a channel transformation to the encoded vectors during transmission. A processor coupled to the second communication device receives the transformed signals, constructs a matrix based on the transformed signals, detects an effective channel thereof, and identifies left and right singular vectors of the effective channel. A precoding matrix is selected from a codebook of unitary matrices based on a message, and a second encoded vector is produced based on a second known vector, the precoding matrix, a complex conjugate of the left singular vectors, and the right singular vectors. A first symbol of the second encoded vector and a second symbol of the second encoded vector are sent to the first communication device for identification of the message.

20 Claims, 9 Drawing Sheets

(51) Int. Cl.
  *H04B 7/0417* (2017.01)
  *H04B 7/0456* (2017.01)
(58) Field of Classification Search
  USPC ......... 370/329; 375/329, 322, 316, 295, 219
  See application file for complete search history.

(56) References Cited

U.S. PATENT DOCUMENTS

| | | | |
|---|---|---|---|
| 5,555,268 | A | 9/1996 | Fattouche et al. |
| 6,389,138 | B1 | 5/2002 | Li et al. |
| 7,376,173 | B2 | 5/2008 | Yedidia et al. |
| 7,454,084 | B2 | 11/2008 | Faber et al. |
| 8,737,509 | B2 * | 5/2014 | Yu ................ H04B 7/0639 375/267 |
| 9,648,444 | B2 | 5/2017 | Agee |
| 10,020,839 | B2 | 7/2018 | Robinson et al. |
| 10,491,262 | B2 | 11/2019 | Robinson et al. |
| 10,637,705 | B1 | 4/2020 | Shattil |
| 10,735,062 | B1 | 8/2020 | Robinson |
| 10,771,128 | B1 | 9/2020 | Sitaram et al. |
| 10,819,387 | B2 | 10/2020 | Robinson et al. |
| 10,833,749 | B1 | 11/2020 | Robinson |
| 10,873,361 | B2 | 12/2020 | Robinson |
| 10,917,148 | B2 | 2/2021 | Robinson |
| 10,965,352 | B1 | 3/2021 | Robinson |
| 11,018,715 | B2 | 5/2021 | Robinson et al. |
| 11,025,470 | B2 | 6/2021 | Robinson |
| 11,050,604 | B2 | 6/2021 | Robinson |
| 2002/0009209 | A1 | 1/2002 | Inoue et al. |
| 2003/0185309 | A1 | 10/2003 | Pautler et al. |
| 2003/0210750 | A1 | 11/2003 | Onggosanusi et al. |
| 2004/0059547 | A1 | 3/2004 | Aftelak |
| 2004/0105489 | A1 | 6/2004 | Kim et al. |
| 2004/0253986 | A1 | 12/2004 | Hochwald et al. |
| 2006/0109897 | A1 | 5/2006 | Guo et al. |
| 2006/0274825 | A1 | 12/2006 | Ciofi et al. |
| 2007/0091999 | A1 | 4/2007 | Nissan-Cohen et al. |
| 2007/0098063 | A1 | 5/2007 | Reznic et al. |
| 2007/0115797 | A1 | 5/2007 | Reznic et al. |
| 2009/0046801 | A1 | 2/2009 | Pan et al. |
| 2009/0316802 | A1 | 12/2009 | Tong et al. |
| 2010/0119001 | A1 | 5/2010 | Walton et al. |
| 2010/0202553 | A1 | 8/2010 | Kotecha et al. |
| 2010/0246656 | A1 | 9/2010 | Hammerschmidt |
| 2010/0329393 | A1 | 12/2010 | Higuchi |
| 2011/0134902 | A1 | 6/2011 | Ko et al. |
| 2011/0235728 | A1 | 9/2011 | Karabinis |
| 2012/0093090 | A1 | 4/2012 | Han et al. |
| 2012/0257664 | A1 | 10/2012 | Yue et al. |
| 2013/0064315 | A1 | 3/2013 | Heath, Jr. et al. |
| 2013/0100965 | A1 | 4/2013 | Ohmi et al. |
| 2013/0223548 | A1 | 8/2013 | Kang et al. |
| 2014/0056332 | A1 | 2/2014 | Soualle et al. |
| 2015/0003500 | A1 | 1/2015 | Kesling et al. |
| 2015/0049713 | A1 | 2/2015 | Lan et al. |
| 2015/0171982 | A1 | 6/2015 | Wang et al. |
| 2015/0304130 | A1 | 10/2015 | Logothetis et al. |
| 2016/0309396 | A1 | 10/2016 | Chai et al. |
| 2016/0337156 | A1 | 11/2016 | Milleth et al. |
| 2017/0180020 | A1 | 6/2017 | Namgoong et al. |
| 2017/0237545 | A1 | 8/2017 | Khandani |
| 2017/0288902 | A1 | 10/2017 | Rusek et al. |
| 2017/0294946 | A1 | 10/2017 | Wang et al. |
| 2017/0302415 | A1 | 10/2017 | Park et al. |
| 2017/0331539 | A1 | 11/2017 | Pham et al. |
| 2019/0075091 | A1 | 3/2019 | Shattil et al. |
| 2019/0097694 | A1 | 3/2019 | Jeon et al. |
| 2019/0158206 | A1 | 5/2019 | Li et al. |
| 2019/0215222 | A1 | 7/2019 | Cheng et al. |
| 2019/0268035 | A1 | 8/2019 | Robinson et al. |
| 2019/0280719 | A1 | 9/2019 | Yu |
| 2019/0349042 | A1 | 11/2019 | Ramireddy et al. |
| 2019/0349045 | A1 | 11/2019 | Varatharaajan et al. |
| 2019/0379430 | A1 | 12/2019 | Pekoz et al. |
| 2020/0014407 | A1 | 1/2020 | Smith et al. |
| 2020/0366333 | A1 | 11/2020 | Robinson |
| 2021/0006288 | A1 | 1/2021 | Robinson et al. |
| 2021/0006303 | A1 | 1/2021 | Robinson |
| 2021/0006317 | A1 | 1/2021 | Robinson |
| 2021/0006446 | A1 | 1/2021 | Robinson |
| 2021/0006451 | A1 | 1/2021 | Robinson |
| 2021/0036901 | A1 | 2/2021 | Robinson |
| 2021/0067211 | A1 | 3/2021 | Robinson |
| 2021/0159950 | A1 | 5/2021 | Robinson |
| 2021/0184899 | A1 | 6/2021 | Robinson |

FOREIGN PATENT DOCUMENTS

| | | | |
|---|---|---|---|
| CN | 101795257 | A | 8/2010 |
| CN | 103634065 | A | 3/2014 |
| CN | 103716111 | A | 4/2014 |
| EP | 1826915 | A1 | 8/2007 |
| EP | 1883168 | A2 | 1/2008 |
| EP | 3211812 | A1 | 8/2017 |
| KR | 10-2010-0131373 | A | 12/2010 |
| KR | 10-2013-0118525 | A | 10/2013 |
| WO | WO 2008/024773 | A2 | 2/2008 |
| WO | WO 2008/098225 | A2 | 8/2008 |

OTHER PUBLICATIONS

Huo and Gong, "A New Efficient Physical Layer OFDM Encryption Scheme," IEEE INFOCOM 2014, IEEE Conference on Computer Communications, pp. 1024-1032.
International Search Report and Written Opinion for International Application No. PCT/US2020/040393, dated Sep. 3, 2020, 12 pages.
Liu et al., "Piecewise Chaotic Permutation Method for Physical Layer Security in OFDM-PON," IEEE Photonics Technology Letters, Nov. 2016, vol. 28, No. 21, pp. 2359-2362.
International Search Report and Written Opinion for PCT Application No. PCT/US2017/061489, dated Feb. 26, 2018, 8 pages.
Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.
Ericsson, "Signature design for NoMA," 3GPP TSG-RAN WG1 Meeting #93, Tdoc R1-1806241, Busan, South Korea, May 21-25, 2018, pp. 1-5.
Huawei, "Initial Performance Evaluation of Multi-user MIMO Scheme for E-UTRA Downlink," 3GPP TSG RAN WG1, R1-051094, San Diego, USA, Oct. 10-14, 2005, 7 pages.
International Search Report and Written Opinion for International Application No. PCT/US2020/039879, dated Oct. 9, 2020, 10 pages.
International Search Report and Written Opinion for International Application No. PCT/US2020/039606, dated Nov. 25, 2020, 18 pages.
International Search Report and Written Opinion for International Application No. PCT/US2020/043686, dated Dec. 3, 2020, 24 pages.
International Search Report and Written Opinion for International Application No. PCT/US2020/051927, dated Jan. 15, 2021, 19 pages.
International Search Report and Written Opinion for International Application No. PCT/US2020/049031, dated Jan. 18, 2021, 20 pages.
International Search Report and Written Opinion for International Application No. PCT/US2021/017043, dated May 14, 2021, 12 pages.
Invitation to Pay Additional Fees for International Application No. PCT/US2020/039606 dated Sep. 21, 2020, 12 pages.
Invitation to Pay Additional Fees for International Application No. PCT/US2020/043686 dated Oct. 7, 2020, 16 pages.
Invitation to Pay Additional Fees for International Application No. PCT/US2020/049031 dated Nov. 11, 2020, 13 pages.
Ma et al., "Secure Communication in TDS-OFDM System Using Constellation Rotation and Noise Insertion," IEEE Transactions on Consumer Electronics, Aug. 2010, vol. 56, No. 3, pp. 1328-1332.

(56) References Cited

OTHER PUBLICATIONS

Non-Final Office Action for U.S. Appl. No. 16/459,254 dated Nov. 5, 2020, 9 pages.
Sung et al., "M-PSK Codebook Based Clustered MIMO-OFDM SDMA with Efficient Codebook Search," IEEE, 2012, 5 pages.
Tseng et al., "Hardware Implementation of the Joint Precoding Sub-System and MIMO Detection Preprocessor in IEEE 802.11n/ac WLAN," Journal of Signal Processing Systems (2019) 91:875-884.
Xie et al., "Geometric Mean Decomposition Based Hybrid Precoding for Millimeter-Wave Massive MIMO," China Communications, May 2018, vol. 15, Issue 5, pp. 229-238.
Zhang et al., "A Novel Precoder Design for MIMO Multicasting with MMSE-DFE Receivers," IEEE, 2014, 5 pages.
Zheng et al., "Performance Comparison on the Different Codebook for SU/MU MIMO," IEEE 802.16 Broadband Wireless Access Working Group, IEEE C802.16m-08/1183r1, Sep. 12, 2008, pp. 1-9.

\* cited by examiner

700A

Produce, via at least one processor operatively coupled to a first communication device, a first encoded vector, using a first known vector and a unitary matrix 701A

Transmit a signal representing a first symbol of the first encoded vector to a second communication device, through a communication channel that applies a channel transformation to the first symbol during transmission to produce a first transformed symbol 702A

Transmit a signal representing a second symbol of the first encoded vector to the second communication device, through a communication channel that applies the channel transformation to the second symbol during transmission to produce a second transformed symbol 703A

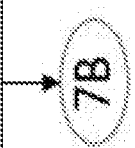

FIG. 7A

SINGLE INPUT SINGLE OUTPUT (SISO) PHYSICAL LAYER KEY EXCHANGE

STATEMENT REGARDING FEDERAL GOVERNMENT INTEREST

This United States Government holds a nonexclusive, irrevocable, royalty-free license in the invention with power to grant licenses for all United States Government purposes.

CROSS-REFERENCE TO RELATED APPLICATIONS

This application is related to U.S. Nonprovisional patent application Ser. No. 15/351,428, filed on Nov. 14, 2016 and titled "RELIABLE ORTHOGONAL SPREADING CODES IN WIRELESS COMMUNICATIONS" (now U.S. Pat. No. 10,020,839), U.S. patent application Ser. No. 16/459,245, filed on Jul. 1, 2019 and titled "SYSTEMS, METHODS AND APPARATUS FOR SECURE AND EFFICIENT WIRELESS COMMUNICATION OF SIGNALS USING A GENERALIZED APPROACH WITHIN UNITARY BRAID DIVISION MULTIPLEXING", and U.S. patent application Ser. No. 16/527,240, filed on Jun. 31, 2019 and titled "COMMUNICATION SYSTEM AND METHOD USING UNITARY BRAID DIVISIONAL MULTIPLEXING (UBDM) WITH PHYSICAL LAYER SECURITY," the disclosures of each of which are incorporated by reference herein in their entireties for all purposes.

TECHNICAL FIELD

The present disclosure relates to systems and methods for transmitting wireless signals for electronic communications and, in particular, to increasing the data rate of, and reducing the computational complexity of, wireless communications.

BACKGROUND

In multiple access communications, multiple user devices transmit signals over a given communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase, and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital-to-analog converter, and then up-converted to the carrier frequency for transmission. When different user devices send symbols at the same time over the communications channel, the sine waves represented by those symbols are superimposed to form a combined signal that is received at the receiver.

A known approach to wireless signal communication is orthogonal frequency-division multiplexing (OFDM), which is a method of encoding digital data on multiple carrier frequencies. OFDM methods have been adapted to permit signal communications that cope with severe conditions of communication channels such as attenuation, interference, and frequency-selective fading. Such an approach, however, does not address a desire for a physical layer of security of signal transmission. Furthermore, the OFDM signal includes signal amplitudes over a very large dynamic range, often involving transmitters that can handle a high peak-to-average-power ratio. Thus, a need exists for improved systems, apparatuses and methods for a secure, power efficient approach to wireless communication of signals.

SUMMARY

In some embodiments, a processor coupled to a first communication device produces and transmits a first encoded vector and a second encoded vector to a second communication device via a communication channel that applies a channel transformation to the encoded vectors during transmission. A processor coupled to the second communication device receives the transformed signals, constructs a matrix based on the transformed signals, detects an effective channel thereof, and identifies left and right singular vectors of the effective channel. A precoding matrix is selected from a codebook of unitary matrices based on a message, and a second encoded vector is produced based on a second known vector, the precoding matrix, a complex conjugate of the left singular vectors, and the right singular vectors. A first symbol of the second encoded vector and a second symbol of the second encoded vector are sent to the first communication device for identification of the message.

In some embodiments, a communication method using UBDM or OFDM with physical layer security includes receiving, via a first communication device and at a first processor, a first signal that represents a first symbol of a first encoded vector and a channel transformation. The method also includes receiving, via the first communication device and at the first processor, a second signal that represents a second symbol of the first encoded vector and a channel transformation. The first processor detects a representation of an effective channel based on the first signal and the second signal. The first processor performs a singular value decomposition of the representation of the effective channel to identify a left singular vector of the representation of the effective channel and a right singular vector of the representation of the effective channel. The first processor selects a precoding matrix from a codebook of unitary matrices, the precoding matrix associated with an index for a message for transmission. The first processor produces a second encoded vector based on a second known vector, the precoding matrix, a complex conjugate of the left singular vector, and the right singular vector of the representation of the effective channel. The method also includes transmitting (1) a signal that represents a first symbol of the second encoded vector and (2) a signal that represents a second symbol of the second encoded vector, through a communication channel, to a second communication device, for identification of the message at a second processor associated with the second communication device.

BRIEF DESCRIPTION OF THE DRAWINGS

FIG. 7A is a flowchart illustrating a method of operating a UBDM system, according to an embodiment.

DETAILED DESCRIPTION

Figure 1:
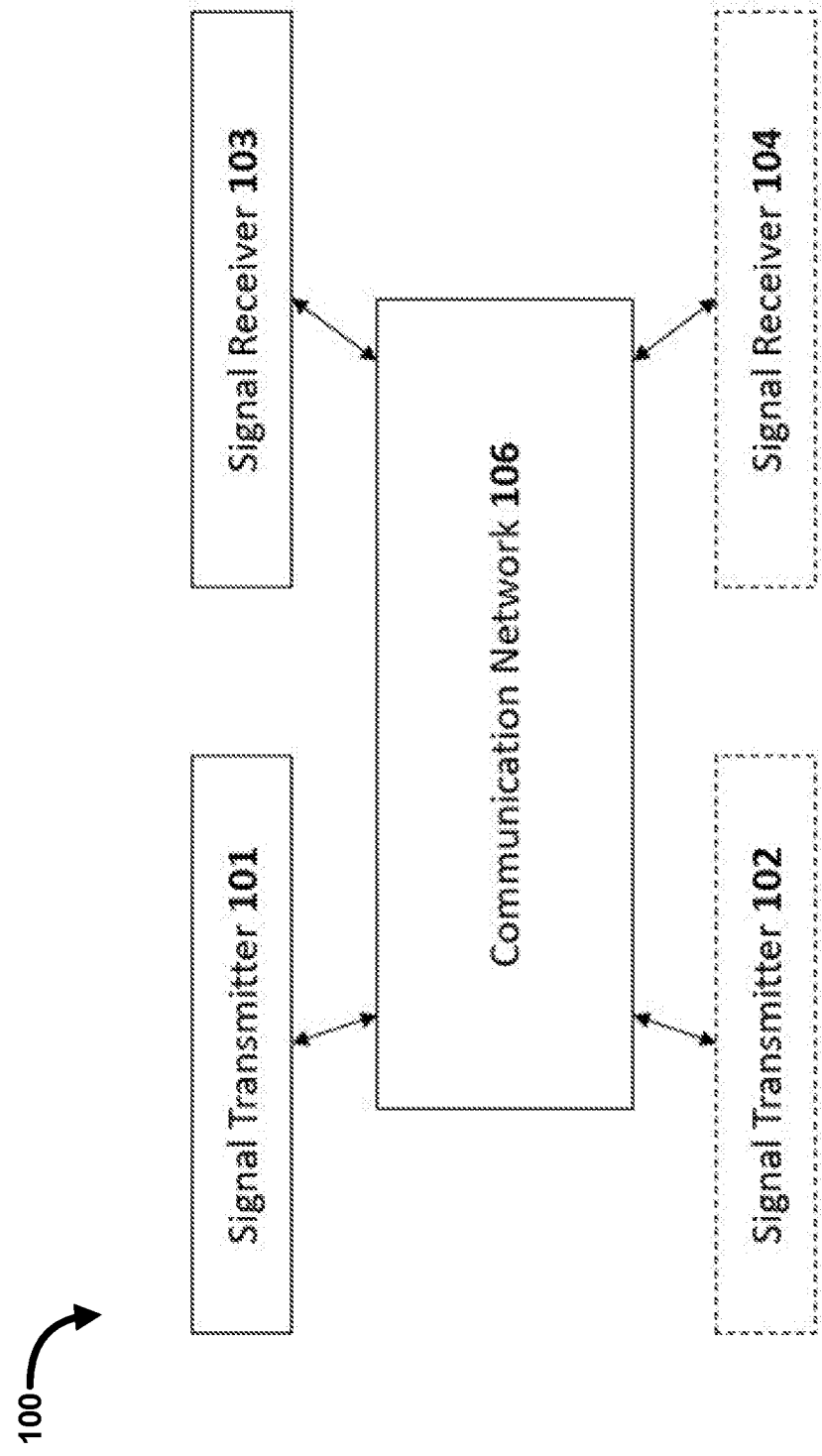
FIG. 1 is a schematic illustration of a secure and efficient Unitary Braid Divisional Multiplexing (UBDM) system, according to some embodiments.

The present disclosure sets forth a Unitary Braid Divisional Multiplexing (UBDM) system, also referred to herein as a generalized UBDM (gUBDM) system, for modulation-based communications security, followed by a UBDM or OFDM system implementation that includes Physical Layer Security (PLS) that is implemented via a Single Input Single Output (SISO) configuration. The PLS can be referred to as "enhanced-MOPRO," and includes a modified version of a key exchange algorithm referred to as MIMO-OFDM Precoding with Rotation (MOPRO).

In some embodiments, a communication method that uses unitary braid divisional multiplexing (UBDM) with SISO-implemented PLS includes receiving, via a first communication device and at a first processor, a first signal that represents a first symbol of a first encoded vector and a channel transformation. The method also includes receiving, via the first communication device and at the first processor, a second signal that represents a second symbol of the first encoded vector and a channel transformation. A representation of an effective channel is detected, via the first processor, based on the first signal and the second signal. The first processor performs a singular value decomposition of the representation of the effective channel to identify a left singular vector of the representation of the effective channel and a right singular vector of the representation of the effective channel. The first processor selects a precoding matrix from a codebook of unitary matrices, the precoding matrix associated with an index for a message for transmission. The first processor produces a second encoded vector based on a second known vector, the precoding matrix, a complex conjugate of the left singular vector, and the right singular vector of the representation of the effective channel. The method also includes transmitting (1) a signal that represents a first symbol of the second encoded vector and (2) a signal that represents a second symbol of the second encoded vector, through a communication channel, to a second communication device, for identification of the message at a second processor associated with the second communication device.

In some embodiments, a communication method using UBDM or OFDM with SISO-implemented PLS includes generating, at a processor of a first communication device, a first encoded vector using a known vector and a unitary matrix. A first signal representing a first symbol of the first encoded vector and a second signal representing a second symbol of the first encoded vector are transmitted to a second communication device through a communication channel that applies a channel transformation to the first signal and to the second signal during transmission. A third signal representing a first symbol of a second encoded vector and the channel transformation, and a fourth signal representing a second symbol of the second encoded vector and the channel transformation are received at the processor and from the second communication device. The processor detects a representation of an effective channel based on the third signal and the fourth signal. The processor performs a singular value decomposition of the representation of the effective channel to identify a right singular vector of the representation of the effective channel. The method also includes querying a codebook of unitary matrices to identify a message associated with the third signal and the fourth signal based on the singular vector of the representation of the effective channel and the unitary matrix.

In some embodiments set forth herein, a UBDM system with SISO-implemented PLS includes a modified Orthogonal Frequency Divisional Multiplexing (OFDM) system. The modified OFDM system can include some components common to an unmodified OFDM system, but also includes a generalized version of an OFDM component (e.g., a subset of the functionality of the OFDM). The UBDM system can be designed to implement (e.g., in hardware and/or software executed by or stored in hardware) a modified OFDM step during operation, to execute a paired operation including performing an inverse Fast Fourier Transform (iFFT) (or a Fast Fourier Transform FFT) of signals at a signal transmitter to generate transformed signals that are transmitted, and then performing a Fast Fourier Transform (FFT) (or an inverse Fourier Transform iFFT) on the transformed signals at a receiver to recover the signals. The modification includes generalizing the iFFT/FFT performed by the transmitter to an arbitrary transformation (represented by an arbitrary matrix, for example an arbitrary unitary matrix).

Embodiments of a UBDM system with SISO-implemented PLS, as described herein, and including embodiments with the above modification of an OFDM system, can impart exceptional security and efficiency in transmission of signals over wireless communication channels. Other benefits of embodiments of the UBDM as described herein include an ability to use non-linear transformations, as well as a generalized implementation involving equiangular tight frame (ETF) transformations or nearly equiangular tight frame (NETF) transformations as an example. Standard OFDM doesn't allow for a generalization to ETF/NETF "overloading."

Generalizing to an arbitrary unitary as implemented in a UBDM system as described herein can also have the effect of spreading the energy of each symbol or vector in a signal to be transmitted across the different subcarriers. Spreading the energy of each symbol or vector in a signal to be transmitted can reduce the Peak-to-Average-Power-Ratio (PAPR) of the signal, and provide a degree of spreading (and, therefore, interference rejection) that is comparable to systems such as Direct Sequence Spread Spectrum (DSSS)

systems. Spreading the energy of each symbol or vector in a signal to be transmitted can also provide an extra degree of freedom in multiplexing. In other words, in addition to standard frequency division multiplexing and time division multiplexing, a UBDM system introduces code division multiplexing, which adds a powerful degree of freedom for multiplexing in a signal transmission system.

"Physical Layer Security" (PLS) refers to the leveraging of physical properties of a communications channel between users of a communications system for the purposes of exchanging secret information. Although some of the foregoing UBDM implementations describe the application of security at the physical layer, they do not, in a strict sense, incorporate PLS, which involves the exploitation of a physical property of the shared channel between two users. For example, in PLS, users generate a secret key for a symmetric cryptologic/security scheme (e.g., Advanced Encryption Standard (AES)), based on the physical properties of a communications channel, for the secret information. Unless an eavesdropper has a receiver that is sufficiently close to one of the users to directly measure (or to gather sufficient information to approximate) the physical properties of the communications channel, the eavesdropper will be unable to access the shared secret. According to embodiments set forth below, PLS can be implemented in combination with UBDM (or generalized UBDM), OFDM, or any other communication system, to enhance security of the communications.

As used herein, a "transmitter" (or "signal transmitter") refers to any collection of components that are used in the transmission of signals, including any combination of, but limited to, one or more: antennas, amplifiers, cables, digital-to-analog converters, filters, up-converters, processors (e.g., for reading bits and/or mapping of bits to a baseband), etc. Similarly, as used herein, a "receiver" (or "signal receiver") refers to any collection of components that are used in receiving signals, including any combination of, but limited to, one or more: antennas, amplifiers, cables, analog-to-digital converters, filters, down-converters, processors, etc.

Sending and Receiving Signals in SISO-Implemented Enhanced-MOPRO

FIG. 1 is a schematic illustration of a secure and efficient, Unitary Braid Divisional Multiplexing system 100, also referred to herein as a "UBDM system" or "a system," according to an embodiment. The UBDM 100 is configured to send and/or receive wireless electronic communications in a secure and efficient manner. The UBDM system 100 includes a signal transmitter 101 and a signal receivers 103, and a communication network 106, as illustrated in FIG. 1. The UBDM system 100 optionally includes a signal transmitter 102 and a signal receivers 104. The UBDM system 100 is configured to process and transmit a signal from the signal transmitter 101 and/or optionally from the signal transmitter 102 via one or more communication channels defined via the communication network to the signal receiver 103 and/or optionally to the signal receiver 104. Given a signal to be transmitted from a signal transmitter 101 and/or 102 and to a signal receiver 103 and/or 104, the UBDM system 100 is configured such that the signal transmitter 101 and/or 102 can process the signal by applying an arbitrary transformation to generate a transformed signal that is transmitted to the signal receivers 103 and/or 104. The arbitrary transformation can be applied using one or more of hardware (e.g., a field-programmable gate array) and/or software. The signal transmitters 101 and/or 102 also send to the signal receivers 103 and/or 104 (e.g., before transmitting the signal) an indication of the arbitrary transformation that was applied. The signal receivers 103 and/or 104 are configured to receive the transformed signal and the indication of the arbitrary transformation applied by the signal transmitter(s) and/or apply an inverse of the arbitrary transformation to recover the signal from the transformed signal. While the system 100 is illustrated to include two signal transmitters 101 and 102, and two signal receivers 103 and 104, a similar UBDM system can include any number of signal transmitters and/or signal receivers.

In some embodiments, the communication network 106 (also referred to as "the network") can be any suitable communication network that includes one or more wired and/or wireless communication channels configured for transferring data, operating over public and/or private networks. Although not shown, in some implementations, the signal transmitters 101,102 and signal receivers 103,104 (or portions thereof) can be configured to operate within, for example, a data center (e.g., a cloud computing environment), a computer system, one or more server/host devices, and/or so forth. In some implementations, the signal transmitters 101,102 and signal receivers 103,104 can function within various types of network environments that can include one or more devices and/or one or more server devices. For example, the network 106 can be or can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), a Bluetooth® network, a virtual network, and/or any combination thereof. In some instances, the communication network 106 can be a wireless network such as, for example, a Wi-Fi or wireless local area network ("WLAN"), a wireless wide area network ("WWAN"), and/or a cellular network.

The communication network 106 can be, or can include a wired network and/or a wireless network implemented using, for example, gateway devices, bridges, switches, and/or so forth. The wired network or the wireless network can use one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network 106 can include one or more segments and/or can have portions based on various protocols such as Internet Protocol (IP) and/or a proprietary protocol. The communication network 106 can include at least a portion of the Internet. In some instances, the communication network 106 can include multiple networks or subnetworks operatively coupled to one another by, for example, network bridges, routers, switches, gateways and/or the like (not shown).

Figure 2:
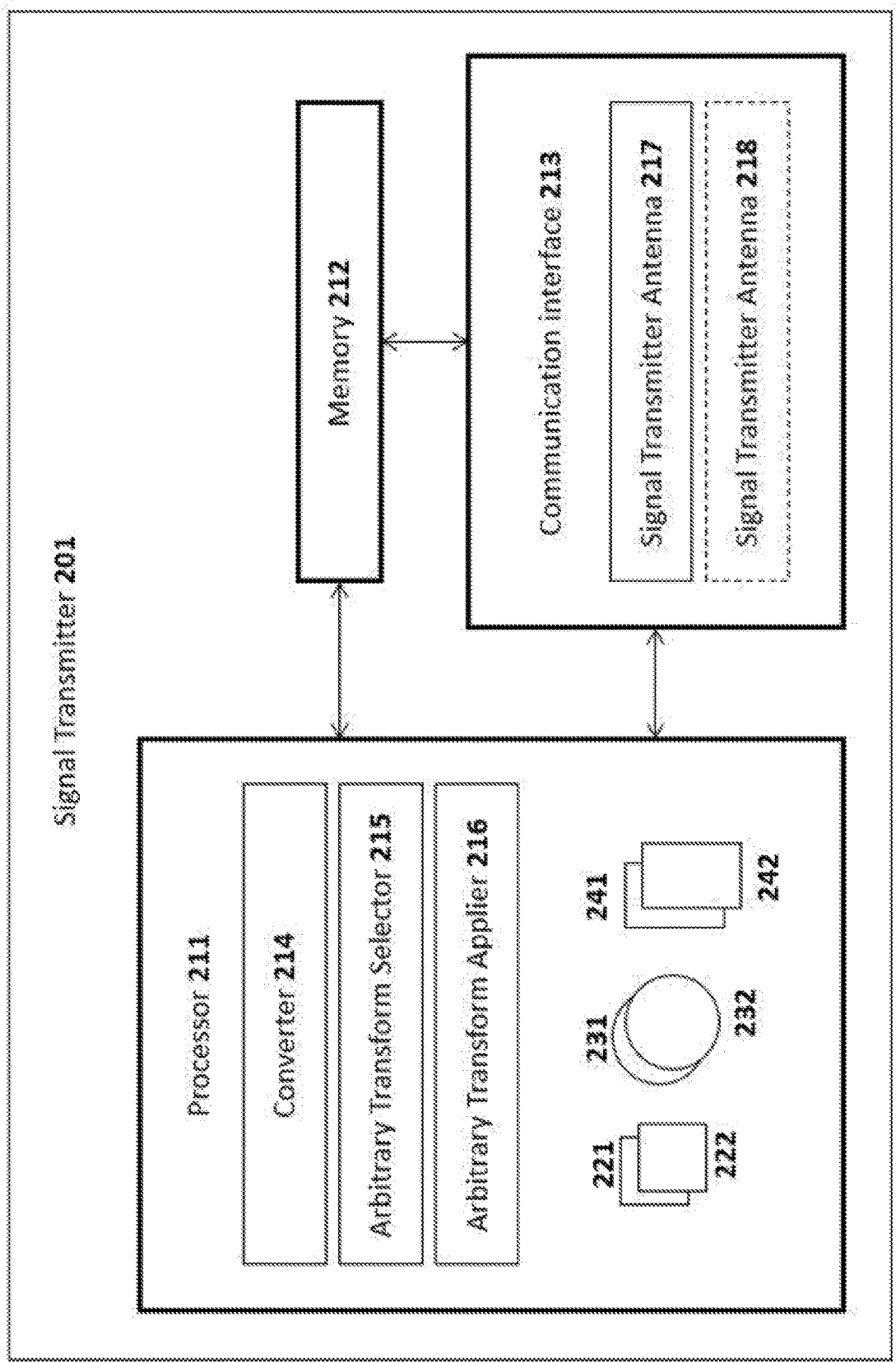
FIG. 2 is a schematic representation of a signal transmitter within a UBDM system, according to some embodiments.

FIG. 2 is a schematic block diagram of an example signal transmitter 201 that can be a part of a UBDM system such as the UBDM system 100 described above with reference to FIG. 1, according to an embodiment. The signal transmitter 201 can be structurally and functionally similar to the signal transmitter 101 and signal transmitter 102 of the system 100, shown and describe above with respect to FIG. 1. In some embodiments, the signal transmitter 201 can be, or can include, a processor configured to process instructions stored in a memory. The signal transmitter 201 can be a hardware-based computing device and/or a multimedia device, such as, for example, a server, a desktop compute device, a smartphone, a tablet, a wearable device, a laptop and/or the like. The signal transmitter 201 includes a processor 211, a memory 212 (e.g., including data storage), and a communication interface 213.

The processor 211 can be, for example, a hardware based integrated circuit (IC) or any other suitable processing device configured to run and/or execute a set of instructions or code. For example, the processor 211 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 211 is operatively coupled to the memory 212 through a system bus (for example, address bus, data bus and/or control bus, not shown).

The processor 211 can be configured to receive a signal to be transmitted and to perform processing to transform the signal into a transformed signal by applying an arbitrary transformation. In some implementations, the processor 211 can apply an arbitrary transformation that is defined to be a unitary transformation such that the transformed signal can be transmitted in a secure and efficient manner using the UBDM system.

The processor 211 can include a set of components including a converter 214, an arbitrary transform selector 215, and an arbitrary transform applier 216. The processor 211 can receive a set of signals 221 and 222, perform a set of arbitrary transformations 231 and 232, and send a set of transformed signals 241 and 242.

In some embodiments, each of the converter 214, an arbitrary transform selector 215, and an arbitrary transform applier 216 can be software stored in the memory 212 and executed by processor 211. For example, each of the above mentioned portions of the processor 211 can be code to cause the processor 211 to execute the converter 214, the arbitrary transform selector 215, and the arbitrary transform applier 216. The code can be stored in the memory 212 and/or a hardware-based device such as, for example, an ASIC, an FPGA, a CPLD, a PLA, a PLC and/or the like. In other embodiments, each of the converter 214, the arbitrary transform selector 215, and the arbitrary transform applier 216 can be hardware configured to perform the respective functions. In some embodiments, each of the components can a combination of software and hardware. In some embodiments one or more of the components (e.g., converter 214, the arbitrary transform selector 215, the arbitrary transform applier 216) of the processor 211 can be configured to operate based on one or more platforms (e.g., one or more similar or different platforms) that can include one or more types of hardware, software, firmware, operating systems, runtime libraries, and/or so forth. In some implementations, the components of the signal transmitter can be configured to operate within a cluster of devices (e.g., a server farm). In such an implementation, the functionality and processing of the components of the signal transmitter 201 can be distributed to several devices of the cluster of devices. The components of the signal transmitter 201 and a signal receiver (such as the signal receiver 301 shown and described in FIG. 3) can be, or can include, any type of hardware and/or software configured to process attributes.

The converter 214 can be configured to receive a signal to be transmitted and prepare the signal in a form that can be transformed by the processor 211 using an arbitrary transformation. For example, in some embodiments, the processor 211 can receive a signal in the form of a parallel set of symbols $b_n$. The converter 214 can be configured to perform a parallel-to-serial computation (e.g., using a shift register) on the set of symbols $b_n$ to convert the parallel set of symbols $b_n$ to a serial set of symbols. In some other embodiment, the converter 214 can include a configuration to perform a serial-to-parallel computation (e.g., using a shift register) on a serial set of symbols to a parallel set of symbols. In some embodiments, the converter 214 can generate a plurality of vectors (e.g., representing the set of signals 221 and 221) based on the set of symbols. In some implementations, the converter 214 can receive a signal in the form of a plurality of input bits. The converter 214 can be configured to generate a plurality of symbols based on the plurality of input bits. The converter 214 can be further configured to generate a plurality of blocks based on the plurality of symbols where each block from the plurality of blocks represents a vector from a plurality of vectors (e.g., representing the set of signals 221 and 222). Alternatively, the converter 214 can be further configured to generate multiple pluralities of blocks based on the plurality of symbols where each plurality of blocks from the multiple pluralities of blocks represents a vector from a plurality of vectors (e.g., representing the set of signals 221 and 222).

The arbitrary transform selector 215 can be configured to select, based at least partly on the signal to be transmitted or the plurality of vectors generated by the converter 214, an arbitrary transformation (e.g., arbitrary transformation 231 and 232) to be applied on the plurality of vectors (e.g., representing the set of signals 221 and 221) to securely and efficiently transmit the vectors from the signal transmitter 201 to one or more receivers associated with the UBDM system. The arbitrary transformation (e.g., arbitrary transformation 231 and 232) can include one of, or a combination of any of, a non-linear transformation, a unitary transformation, an ETF transformation, or a NETF transformation. In some embodiments, the arbitrary transform selector 215 can have access to a library of arbitrary transformations that are unitary by design (e.g., arbitrary transformation 231 and 232) from which one can be selected for transmitting a signal. The arbitrary transform selector 215 can select the arbitrary transformation based, for example, on a transformation type and/or a criteria negotiated between two communicating entities via a telecommunications handshake or otherwise input by a participant in the communications system. The criteria can include, for example, one or more of: a desired security level, a latency threshold, an error rate threshold, a minimum data rate, a maximum data rate, etc. Notably, unitary transformation is the largest class of transformations that can be performed on a vector of symbols that leaves the total power of the signal unchanged. If a non-unitary transformation is used, then the inverse transformation at the receiver will necessarily amplify noise in some of the received symbols, whereas this is not the case of unitary transformations.

In some instances, the arbitrary transformation selector 215 can be configured to select a transformation that is not an identity matrix, a discrete Fourier matrix, or is any other direct sum of Fourier matrices. For example in some implementations the arbitrary transformations selector 215 can have a library of unitary transformations and based on a set of guidelines select one unitary transformation U and perform computations to check if U is an identity matrix, or a discrete Fourier matrix, or is any other direct sum of a set of Fourier matrices. If U is one of the three above categories, in some embodiments the arbitrary transform selector 215 can discard U and select another transformation that can meet the guideline of not being any of the above three categories. If the arbitrary transformation selector 215 picks a transformation U that is not an identity matrix, a discrete Fourier matrix, or is any other direct sum of Fourier matrices it can then assign U as the arbitrary transformation A to be used for an instance of transforming a signal to be transmitted using a UBDM system according to that embodiment.

In some implementations, the arbitrary transform selector 215 can perform the selection based on a set of inputs received by the processor 211. In some implementations, the arbitrary transform selector 215 can perform the selection based on a set of parameters associated with the signal, the plurality of vectors, the nature of signal transmission (e.g., a security requirement, sensitivity of information content in the signal, path of signal transmission, etc.). In some implementations, the arbitrary transform selector 215 can be configured to define and generate an arbitrary transformation according a set of inputs received by the processor 211 (e.g., a set of user inputs received by the processor 211).

The arbitrary transform applier 216 can apply the selected arbitrary transformation on the plurality of vectors (e.g., vectors 221 and 222) to generate a plurality of transformed vectors (e.g., transformed vectors 241 and 242). In some implementations, the plurality of transformed vectors can have a total magnitude that substantially equals a total magnitude of the plurality of vectors. In some implementations, for example, the arbitrary transform applier 216 can be configured to perform matrix operations to apply a transformation matrix A on a set of vectors to generate transformed vectors. In some implementations, the arbitrary transform applier 216 can be configured to perform any suitable number of procedures (e.g. signal processing procedures, suitable matrix operations) on a set of vectors before applying an arbitrary transformation. The plurality of transformed vectors can then be sent to the signal transmitter antenna 217 and optionally sent to the signal transmitter antenna 218 included in the communicator 213 to be sent to one or more signal receivers associated with a signal receiver. While illustrated to include two signal transmitter antennas 217 and 218, as described above, a similar signal transmitter could include and use a single transmitter antenna according (e.g., signal transmitter antenna 217) to some embodiments, configured to perform Single Input Single Output (SISO) operation. A similar signal transmitter could include any suitable higher number of signal transmitter antennas (i.e., more than two transmitter antennas) according to still other embodiments. In some embodiments, the signal transmitter 201 can include a plurality of antenna arrays configured to perform Multiple Input Multiple Output (MIMO) operations.

The memory 212 of the signal transmitter 201 can be, for example, a random access memory (RAM), a memory buffer, a hard drive, a read-only memory (ROM), an erasable programmable read-only memory (EPROM), a flash drive, a secure digital (SD) memory card, an embedded multi-time programmable (MTP) memory, and/or the like. The memory 212 can store, for example, one or more software modules and/or code that can include instructions to cause the processor 211 to perform one or more processes, functions, and/or the like (e.g., functions associated with the converter 214, the arbitrary transform selector 215, and/or the arbitrary transform applier 216). In some embodiments, the memory 212 can include extendable storage units that can be added and used incrementally. In some implementations, the memory 212 can be a portable memory (e.g., a flash drive, a portable hard disk, and/or the like) that can be operatively coupled to the processor 211. In other instances, a memory can be remotely operatively coupled with the signal transmitter 201. For example, a remote database server can serve as a memory and be operatively coupled to the signal transmitter 201.

The communication interface 213 can be a hardware device operatively coupled to the processor 211 and memory 212 and/or software stored in the memory 212 executed by the processor 211. The communication interface 213 can include a signal transmitter antenna 217 and optionally a signal transmitter antenna 218. While a second transmitter antenna 218 in addition to the transmitter antenna 217 is shown in FIG. 2, a signal transmitter similar to the signal transmitter 201 can have just a single transmitter antenna, according to some embodiments, or any number of transmitter antennas, according to some other embodiments. The communication interface 213 can be, for example, a network interface card (NIC), a Wi-Fi™ module, a Bluetooth® module and/or any other suitable wired and/or wireless communication device. Furthermore, the communication interface 213 can include a switch, a router, a hub and/or any other network device. The communicator 213 can be configured to connect the compute device 201 to a communication network (such as the communication network 106 shown above with respect to FIG. 1). In some instances, the communication network 213 can be configured to connect, via one or more communication channels, to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communication interface 213 can facilitate receiving and/or transmitting a file or a set of files via one or more communication channels through a communication network (e.g., the communication network 106 shown and described with respect to FIG. 1). In some instances, a received file can be processed by the processor 211 and/or stored in the memory 212 as described in further detail herein. In some instances, as described previously, the communication interface 213 can be configured to send a plurality of transformed vectors, via the signal transmitter antenna 217, to at least one signal receiver antenna associated with at least one signal receiver connected to the communication network. The communication interface 213 can also be configured to send and/or receive data associated with a library of arbitrary transformation systems.

Figure 3:
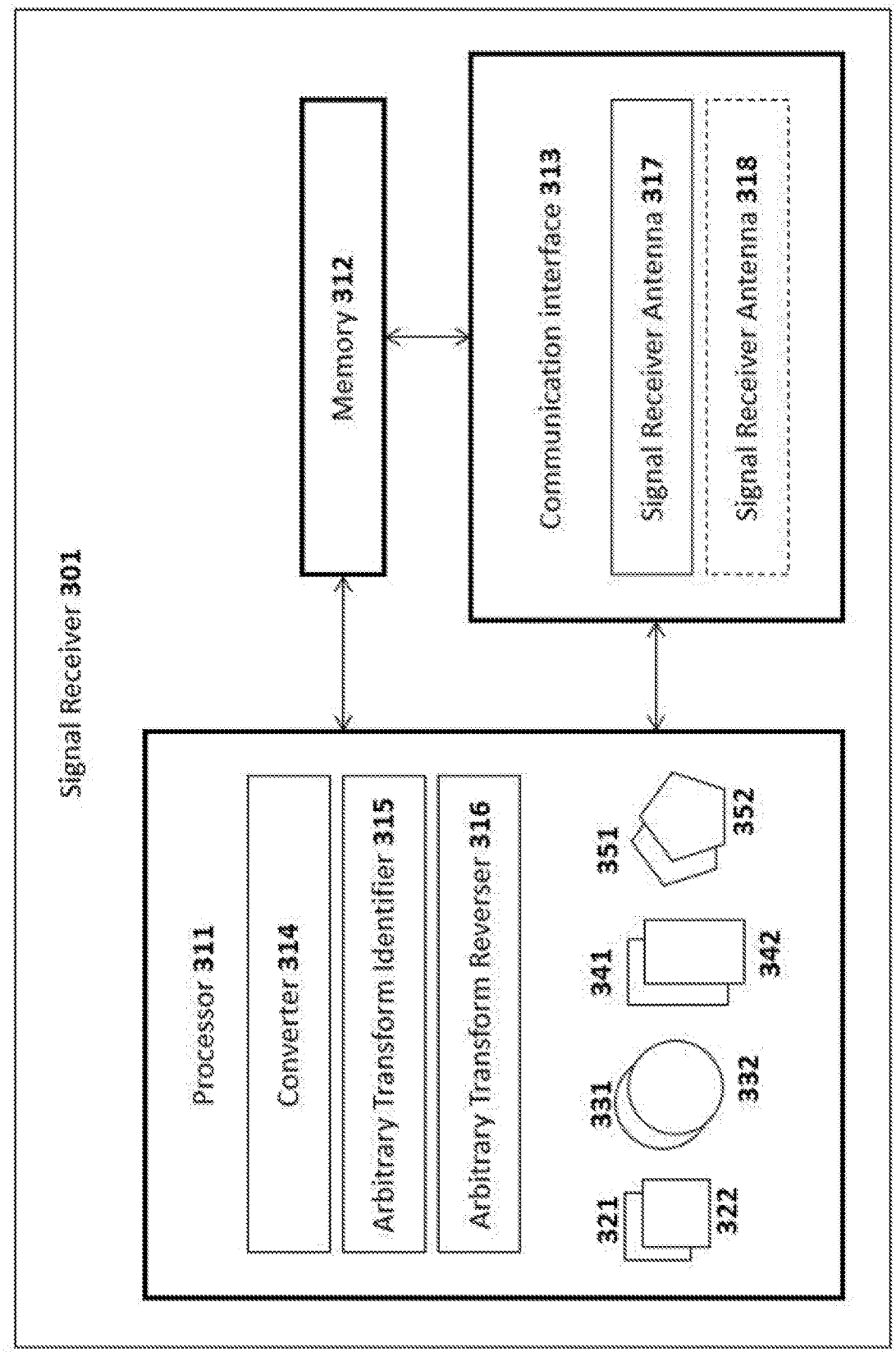
FIG. 3 is a schematic representation of a signal receiver within a UBDM system, according to some embodiments.

FIG. 3 is a schematic block diagram of an example signal receiver 301 that can be a part of a UBDM system such as the UBDM system 100 described above with reference to FIG. 1, according to an embodiment. The signal receiver 301 can be structurally and functionally similar to the signal receiver 101 and signal transmitter 102 of the system 100, shown and describe above with respect to FIG. 1. In some embodiments, the signal receiver 301 can be, or can include, a processor 311 configured to process instructions stored in a memory 312. The signal receiver 301 can be a hardware-based computing device and/or a multimedia device, such as, for example, a server, a desktop compute device, a smartphone, a tablet, a wearable device, a laptop and/or the like. The signal receiver 301 includes the processor 311, the memory 312, and a communication interface 313.

The processor 311 can be, for example, a hardware based integrated circuit (IC) or any other suitable processing device configured to run and/or execute a set of instructions or code. For example, the processor 311 can be, a hardware based integrated circuit (IC) or any other suitable processing device configured to run and/or execute a set of instructions or code. For example, the processor 311 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 311 is operatively coupled to the memory 312 through a system bus (for example, address bus, data bus and/or control bus, not shown).

The processor 311 can be, for example, a hardware based integrated circuit (IC) or any other suitable processing device configured to run and/or execute a set of instructions or code. For example, the processor 311 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 311 is operatively coupled to the memory 312 through a system bus (for example, address bus, data bus and/or control bus, not shown).

The processor 311 can be configured to receive a signal to be transmitted and to perform processing to transform the signal into a transformed signal by applying an arbitrary transformation. The processor 311 can also, or alternatively, be configured to receive a transformed signal that is securely transmitted via one or more communication channels defined in a communication network (e.g., network 106 of FIG. 1), obtain information associated with an arbitrary transformation that was used to generate the transformed signal, and based on the information process the transformed signal to recover an original signal (e.g., by applying an inverse of the arbitrary transformation) such that the original signal can be received by a destination in a secure and efficient manner using the gUBDM system. In some implementations, the processor 311 can apply an arbitrary transformation that is defined to be a unitary transformation such that the transformed signal can be transmitted in a secure and efficient manner using the UBDM system.

The processor 311 can include a set of components including a converter 314, an arbitrary transform identifier 315, and an arbitrary transform reverser 316. The processor 311 can include, or access from memory 312, a plurality of transformed vectors 341 and 342, representing transformed signals, received from one or more transmitter antennas of a signal transmitter (e.g., transmitter antenna 217 or transmitter antenna 218 of signal transmitter 201 as shown and describe with respect to FIG. 2) that is part of the UBDM system that the signal receiver 301 is part of. The processor 311 can include or access in memory 312 a set of arbitrary transformation 331 and 332, identified based on information associated with a signal received from a signal transmitter, and a set of reverse transformations 351 and 352, computed based on the identified arbitrary transformations, and a plurality of vectors 321 and 322 representing a set of original signals.

The arbitrary transform identifier 315 can be configured to receive information associated with a transformed signal (e.g., transformed signal represented by transformed vectors 341 and 342) received via the signal receiver antenna 317 and optionally via the signal receiver antenna 318, the information including an indication of the identity of an arbitrary transformation that was used in generating the transformed signals. The arbitrary transform identifier 315 is configured to, based on the information, identify the arbitrary transformation that can be used to recover an original signal (e.g., original signal represented by plurality of vectors 321 and 322) from the transformed signal (e.g., transformed signals 341 and 342).

The arbitrary transform reverser 316 generates, based on the identity of the arbitrary transformation, an inverse of the identified arbitrary transformation, also referred to as a reverse transformation (e.g., reverse transformations 351 and 352) configured to reverse the effects of the identified arbitrary transformation to recover the original signal from a transformed signal. For example, in some embodiments, the arbitrary transform reverser 316 generates a reverse transformation (A') 351 configured to be applied on a plurality of transformed vectors 341 and 342, representing a transformed signal, and received by the signal receiver 301, so that the reverse transformation (A') 351 can reverse the effects of an arbitrary transformation (A) 331 and recover a plurality of vectors 321 and 322 representing an original signal. In another example, in some embodiments, the arbitrary transform reverser 316 constructs a matrix and generates the reverse transformation (A') based on the matrix configured to be applied to the plurality of transformed vectors 341 and 342 and recover the plurality of vectors 321 and 322.

The converter 314 can be configured to receive a recovered plurality of vectors (e.g., 321 and 322) representing an original signal and regenerate the original signal from the recovered plurality of vectors. For example, in some embodiments, the processor can receive a parallel set of symbols $b_n$. The converter 314 can be configured to perform (e.g., using a phase register) a serial-to-parallel computation on the set of symbols $b_n$ to convert the serial set of symbols $b_n$ to a parallel set of symbols that can be similar to the original signal. In one instance, the converter 314 can include a configuration (e.g., using a shift register) to perform a parallel-to-serial computation. In some embodiments, the converter 314 can receive a plurality of recovered vectors (e.g., vectors 321 and 322) and generate, based on the vectors, an original signal including a set of symbols. In some embodiments, the converter 314 can receive a plurality of recovered vectors (e.g., vectors 321 and 322) and generate, based on the recovered vectors pluralities of blocks each plurality of blocks representing a vector of the plurality of vectors. The converter 314 can then regenerate, based on the pluralities of blocks, a plurality of input bits from which it can recover an original signal.

The memory 312 of the signal receiver 301 can be, for example, a random access memory (RAM), a memory buffer, a hard drive, a read-only memory (ROM), an erasable programmable read-only memory (EPROM), a flash drive, a secure digital (SD) memory card, an embedded multi-time programmable (MTP) memory, and/or the like. The memory 312 can store, for example, one or more software modules and/or code that can include instructions to cause the processor 311 to perform one or more processes, functions, and/or the like (e.g., functions associated with the converter 314, the arbitrary transform identifier 315, and/or the arbitrary transform reverser 316). In some embodiments, the memory 212 can include extendable storage units that can be added and used incrementally. In some implementations, the memory 312 can be a portable memory (e.g., a flash drive, a portable hard disk, and/or the like) that can be operatively coupled to the processor 311. In other instances, a memory can be remotely operatively coupled with the signal receiver 301. For example, a remote database server can serve as a memory and be operatively coupled to the signal receiver 301.

The communication interface 313 can be a hardware device operatively coupled to the processor 311 and memory 312 and/or software stored in the memory 312 executed by the processor 311. The communication interface 313 can include a signal receiver antenna 317 and optionally a signal receiver antenna 318. While a second receiver antenna 318 in addition to the receiver antenna 317 is shown in FIG. 3, a signal receiver similar to the signal receiver 301 can have just a single transmitter antenna, according to some embodiments, or any number of transmitter antennas, according to some other embodiments. The communication interface 313 can be, for example, a network interface card (NIC), a Wi-Fi™ module, a Bluetooth® module and/or any other suitable wired and/or wireless communication device. Furthermore, the communication interface 313 can include a switch, a router, a hub and/or any other network device. The communicator 213 can be configured to connect the compute device 301 to a communication network (such as the communication network 106 shown above with respect to FIG. 1). In some instances, the communication network 313 can be configured to connect, via one or more communication channels, to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communication interface 313 can facilitate receiving and/or transmitting a file and/or a set of files via one or more communication channels defined in a communication network (e.g., the communication network 106 in the UBDM system 100 of FIG. 1). In some instances, a received file can be processed by the processor 311 and/or stored in the memory 312 as described in further detail herein. In some instances, as described previously, the communication interface 313 can be configured such that the signal receiver antenna 317 and optionally signal receiver antenna 318 include one or more antennas tuned to receive transformed signals of a particular predetermined center frequency within a predetermined bandwidth, to receive transformed signals securely and efficiently transmitted by one or more signal transmitter antennas associated with one or more signal transmitters connected to a communication network as part of a UBDM system. The communication interface 313 can also be configured to send and/or receive data associated with a library of arbitrary transformation systems. In some embodiments the signal receiver 301 can include a plurality of antenna arrays configured to perform Multiple Input Multiple Output (MIMO) operations.

Introduction to SISO-Implemented, Enhanced-MOPRO

In an example embodiment of the present disclosure, the first communication device receives an indication to transmit a symbol b using 4 subcarriers, $$\bar{b} = \begin{pmatrix} b_1 \\ b_2 \\ b_1 \\ b_2 \end{pmatrix}$$

After transmitting the symbol b through a communication channel having a channel vector h, a channel vector h transforms the symbol b to a transformed symbol. The transformed symbol received at the second communication device is a Hadamard product of the symbol b and the channel vector h. The second communication device receives the transformed symbol as a 4×1 matrix:

$$\begin{pmatrix} h_1 b_1 \\ h_2 b_2 \\ h_3 b_1 \\ h_4 b_2 \end{pmatrix}$$

The second communication device arranges the transformed symbol (e.g., using the converter 314 shown and described with respect to FIG. 3) into a 2×2 matrix, $$\begin{pmatrix} h_1 b_1 \\ h_2 b_2 \\ h_3 b_1 \\ h_4 b_2 \end{pmatrix} \rightarrow \begin{pmatrix} h_1 b_1 & h_2 b_2 \\ h_3 b_1 & h_4 b_2 \end{pmatrix}$$

The second communication device further performs a matrix decomposition to represent the 2×2 matrix as product of a 2×2 channel transformation matrix and a 2×2 symbol matrix.

$$\begin{pmatrix} h_1 b_1 & h_2 b_2 \\ h_3 b_1 & h_4 b_2 \end{pmatrix} = \begin{pmatrix} h_1 & h_2 \\ h_3 & h_4 \end{pmatrix} \begin{pmatrix} b_1 & 0 \\ 0 & b_2 \end{pmatrix} = Hb$$

By doing so, the second communication device transforms the specially-designed 4-component vector for Single Input Single Output (SISO) operation into a 2×2 matrix, while benefiting efficiency and physical layer security of MOPRO operation or enhanced-MOPRO operation.

Enhanced-MOPRO—MIMO

In one embodiment, MOPRO operation or enhanced-MOPRO operation can be performed on a MIMO system. In one example, the MIMO system can be a 2×2 MIMO system that is used by users "Bob" and "Alice." This example will be performed for a single subcarrier. The following procedure can be performed on each subcarrier in a system having multiple subcarriers. Alice initially chooses an arbitrary unitary matrix G∈U(2), where U represents a unitary matrix. Alice then multiplies a publicly known/agreed-upon training sequence B of 2 symbols $b_1$ and $b_2$ (in two separate symbols) by G, to produce an encoded value for transmission to Bob:

$$t = Gb = \begin{pmatrix} G_{11} & G_{12} \\ G_{21} & G_{22} \end{pmatrix} \begin{pmatrix} b_1 & 0 \\ 0 & b_2 \end{pmatrix}$$

Alice then sends the encoded value to Bob. After going through the channel H, which has SVD $H=BDA^\dagger$ (where D is the diagonal and positive definite matrix of the channel singular values, B are singular vectors on Bob's "side" of the channel (left singular values), and A are the singular vectors on Alice's "side" of the channel (right singular values)), Bob will receive:

$r=Ht=HGb=BDA^\dagger Gb$

Bob has knowledge of the training values in b (e.g., $b_1=1$, $b_2=-1$, etc.) and right multiplies the received r by $b^{-1}$ to isolate the matrix $HG=BDA^\dagger G=BD(G^\dagger A)^\dagger$. In some implementations, the training values in b correspond to, or are based on, elements from one or more constellation diagrams of a signal modulated by one or more digital modulation schemes. Examples of digital modulation schemes include, but are not limited to: binary phase shift keying (BPSK), quadrature phase shift keying (QPSK), eight phase shift keying (8-PSK), and quadrature amplitude modulation (QAM) formats such as 16-QAM, 32-QAM, 64-QAM, etc.

When Bob performs a singular value decomposition of HG, he obtains $\{B,D,G^\dagger A\}$. Bob then responds to Alice with $t'=B^* F_n (G^\dagger A)^\dagger b$, where * denotes complex conjugate but no transpose, and $F_n$ is one of the elements of the public codebook of unitary matrices (Bob may select this matrix, for example, as a way of encoding shared secret bits). It is desired that Eve should not be able to determine which matrix $F_n$ is being transmitted.

After transmitting t' back to Alice, Alice receives which is a version of t' that has been distorted by the transpose of the channel (assuming channel reciprocity):

$r'=H^T t'=H^T B^* F_n A^\dagger Gb=(BDA^\dagger)^T B^* F_n A^\dagger Gb=A^* DB^T B^* F_n A^{\dagger ger} Gb=A^* DF_n A^\dagger Gb$ Because Alice knows the (public) training sequences b, she removes it by right multiplying this matrix by $b^{-1}$, isolating the matrix $A^* D\, F_n A^\dagger G$. She can then perform a singular value decomposition (SVD) of this matrix, to obtain:

$A^* D\, F_n A^\dagger G = A^* D(G^\dagger A F_n^\dagger)^\dagger \to \{A^*, D, G^\dagger A F_n^\dagger\}$.

Because Alice knows G, she multiplies the right singular vectors by G, leaving $AF_n^\dagger$. She then multiplies $AF_n^\dagger$ by the transpose of the left singular vectors, leaving $F_n^\dagger$. This leaves $F_n^\dagger$, from which Alice can determine which of the matrices in the codebook this is, and recover the shared secret bits.

The foregoing is an example of how enhanced-MOPRO works. In regular MOPRO, Bob does not include the factor of $A^\dagger G$ in his response to Alice, and as such, Alice does not need to remove it. MOPRO and enhanced-MOPRO systems described in U.S. patent application Ser. No. 16/527,240 (incorporated by reference herein) operate using a MIMO system, as opposed to a SISO system, for example because if the 2×2 matrices are reduced to scalars, the SVD will no longer be applicable, and the algorithms shown above can become infeasible. As set forth herein, MOPRO and enhancedMOPRO can be performed using a SISO system, using the systems and methods set forth herein.

SISO-Implemented MOPRO and Enhanced-MOPRO

In one embodiment, MOPRO operation or enhanced-MOPRO operation can be performed on a Single Input Single Output (SISO) system. In one example the SISO system can process a 2×2 matrix and perform MOPRO and/or enhanced-MOPRO operations, however the process can also be implemented using any matrix size. Alice (e.g., via signal transmitter 201 as shown and describe with respect to FIG. 2) starts with a publicly-known training sequence of symbols $b_1$ and $b_2$, builds an arbitrary unitary matrix $G \in U(2)$, and computes the product of the unitary matrix G and the publicly known training sequences:

$$Gb = \begin{pmatrix} G_{11} & G_{12} \\ G_{21} & G_{22} \end{pmatrix} \begin{pmatrix} b_1 & 0 \\ 0 & b_2 \end{pmatrix} = \begin{pmatrix} G_{11}b_1 & G_{12}b_2 \\ G_{21}b_1 & G_{22}b_2 \end{pmatrix} \equiv \begin{pmatrix} g_1 & g_2 \\ g_3 & g_4 \end{pmatrix}.$$

All four of components of the product of the unitary matrix G and the publicly-known training sequences are transmitted to Bob (e.g., the signal receiver 301 as shown and described with respect to FIG. 3) via a communication channel (also referred to herein as 'the channel'). So, Alice will split the four components of Gb to two symbols $\bar{t}_1$ and $\bar{t}_2$ (two separate "bauds" sent one after the other in a sequential manner), $$\bar{t}_1 = \begin{pmatrix} g_1 \\ g_4 \\ g_1 \\ g_4 \end{pmatrix}, \bar{t}_2 = \begin{pmatrix} g_2 \\ g_3 \\ g_2 \\ g_3 \end{pmatrix}.$$

In each symbol from the two symbols, each component is in one frequency bin (also referred to herein as 'subcarrier'). This means that, after going through the channel and applying a set of coefficients to the two symbols, Bob receives:

$$\bar{r}_1 = \begin{pmatrix} r_{11} \\ r_{12} \\ r_{13} \\ r_{14} \end{pmatrix} = \begin{pmatrix} h_1 g_1 \\ h_2 g_4 \\ h_3 g_1 \\ h_4 g_4 \end{pmatrix}, \bar{r}_2 = \begin{pmatrix} r_{21} \\ r_{22} \\ r_{23} \\ r_{24} \end{pmatrix} = \begin{pmatrix} h_1 g_2 \\ h_2 g_3 \\ h_3 g_2 \\ h_4 g_3 \end{pmatrix}$$

From these two vectors, Bob builds the following 2×2 matrix, $$R = \begin{pmatrix} r_{11} + r_{22} & r_{12} + r_{21} \\ r_{13} + r_{24} & r_{14} + r_{23} \end{pmatrix}$$

$$= \begin{pmatrix} h_1 g_1 + h_2 g_3 & h_2 g_4 + h_1 g_2 \\ h_3 g_1 + h_4 g_3 & h_4 g_4 + h_3 g_2 \end{pmatrix}$$

$$= \begin{pmatrix} h_1 & h_2 \\ h_3 & h_4 \end{pmatrix} \begin{pmatrix} g_1 & g_2 \\ g_3 & g_4 \end{pmatrix}$$

$$= \begin{pmatrix} h_1 & h_2 \\ h_3 & h_4 \end{pmatrix} \begin{pmatrix} G_{11} & G_{12} \\ G_{21} & G_{22} \end{pmatrix} \begin{pmatrix} b_1 & 0 \\ 0 & b_2 \end{pmatrix}$$

$$= HGb.$$

where the product Gb is used to get the second to last equality. There are several other ways that Alice and Bob could break up the components. In some implementations, Alice can permute the components in any way, and Bob can in return still construct a 2×2 matrix, as described above.

At this point, the problem is almost identical to the MIMO version of MOPRO or enhanced-MOPRO. The only difference is that rank-2 nature of this example has been contrived by splitting multiple frequency subcarrier values into a 2×2 matrix, rather than relying on multiple antennas to get a 2×2 matrix. Mathematically, however, they are identical problems. Therefore, Bob right multiplies the matrix HGb by $b^{-1}$ to calculate HG, and then does a singular value decomposition (SVD) on matrix HG. If the SVD of H is H=BDA$^\dagger$, then the SVD Bob will get is:

$$HG=BDA^\dagger G=BD(G^\dagger A)^\dagger \rightarrow \{B,D,(G^\dagger A)\}$$

Bob then builds the matrix t' as:

$$t' = B*F_n(G^\dagger A)^\dagger b \equiv \begin{pmatrix} t_{11} & t_{12} \\ t_{21} & t_{22} \end{pmatrix}.$$

where each matrix has the same meaning it had in the above example of enhanced-MOPRO on the MIMO system.

From the built t' matrix, Bob builds the two symbols (corresponding to two separate bauds, sent one after the other), to be transmitted over the same frequency subcarriers that Alice used, $$\vec{t}'_1 = \begin{pmatrix} t_{11} \\ t_{11} \\ t_{22} \\ t_{22} \end{pmatrix}, \vec{t}'_2 = \begin{pmatrix} t_{12} \\ t_{12} \\ t_{21} \\ t_{21} \end{pmatrix}.$$

Because $\vec{t}'_1$ and $\vec{t}'_2$ are being transmitted over the same frequency subcarriers, and under an assumption that Bob responds quickly enough that the channel has not changed (or has not substantially changed), then the channel will apply the expected set of channel coefficients, and Alice will receive:

$$\vec{r}'_1 = \begin{pmatrix} r'_{11} \\ r'_{12} \\ r'_{13} \\ r'_{14} \end{pmatrix} = \begin{pmatrix} h_1 t_{11} \\ h_2 t_{11} \\ h_3 t_{22} \\ h_4 t_{22} \end{pmatrix}, \vec{r}'_2 = \begin{pmatrix} r'_{21} \\ r'_{22} \\ r'_{23} \\ r'_{24} \end{pmatrix} = \begin{pmatrix} h_1 t_{12} \\ h_2 t_{12} \\ h_3 t_{21} \\ h_4 t_{21} \end{pmatrix}.$$

Depending on the implementation, the channel can be considered static (i.e., not substantially changed) if Bob responds within 10-20 milliseconds for local area network (LAN) protocol IEEE 802.11, or within 500 microseconds (e.g., within 250-500 microseconds) for the Long-Term Evolution (LTE) 4G mobile telecommunications standard. A channel may be static for a period of time during which the factors impacting or interfering with the channel are unchanged. Such factors can include, but are not limited to, weather conditions (e.g., humidity, fog, rain, etc.), the presence and properties of fixed objects, the presence and properties of moving objects, the presence and properties of terrain, and the stationarity of the transmitting device and/or receiving device. When the channel is static, the correction applied to a received signal to remove the effects of that channel from the received signal (i.e., to "equalize" the channel) can remain constant.

From the above vectors, Alice then builds the 2×2 matrix as:

$$R' = \begin{pmatrix} r'_{11} + r'_{23} & r'_{13} + r'_{21} \\ r'_{12} + r'_{24} & r'_{14} + r'_{22} \end{pmatrix}$$

$$= \begin{pmatrix} h_1 t_{11} + h_3 t_{21} & h_3 t_{22} + h_1 t_{12} \\ h_2 t_{11} + h_4 t_{21} & h_4 t_{22} + h_2 t_{12} \end{pmatrix}$$

$$= \begin{pmatrix} h_1 & h_3 \\ h_2 & h_4 \end{pmatrix} \begin{pmatrix} t_{11} & t_{12} \\ t_{21} & t_{22} \end{pmatrix}$$

$$= H^T B^* F_n (G^\dagger A)^\dagger b$$

$$= (BDA^\dagger)^T B^* F_n (G^\dagger A)^\dagger b$$

$$= A^* D B^T B^* F_n (G^\dagger A)^\dagger b$$

$$= A^* D F_n (G^\dagger A)^\dagger b.$$

The matrix $A^*DF_n(G^\dagger A)^\dagger b$ calculated in this SISO system operation example is identical to the matrix $A^*DF_n(G^\dagger A)^\dagger b$ calculated above with respect to the example of the MIMO system operation. Thus, Alice follows the same procedure as enhanced-MOPRO operated in MIMO system (i.e., removes b, takes a SVD, isolates $F_n$, and recovers the shared secret bits). Therefore, Alice and Bob can fully imitate the functionality of enhanced-MOPRO by operating a SISO system, as described above.

Although the example presented above shows an implementation to perform a 2×2 MIMO system's MOPRO or enhanced-MOPRO operation by using a SISO system, there is no limitation as to size, and any n×n MIMO system's MOPRO or enhanced-MOPRO operation can be implemented on a SISO system. In some instances, a 2×3, a 3×2, a 3×3, a 17×48, or any n×n MIMO system can be implemented. The larger the value of n in an n×n system implemented in SISO, the more subcarriers may be used. In one example, a 3×3 MIMO system's MOPRO or enhanced-MOPRO operation implemented in a SISO system may use a total of 9 subcarriers. In another example, a 17×48 MIMO system's MOPRO or enhanced-MOPRO operation implemented in a SISO system may use 17×48=816 total subcarriers.

In some implementations, the SISO system set forth above can include additional physical security in the vicinity of Alice, making it difficult for Eve to get close to Alice. Alternatively or in addition, the two intended communicating entities may each play the roles of Alice and Bob (as described above) at different times. For example, entity 1 may perform the steps outlined above for Alice, while entity 2 may perform the steps outlined above for Bob (resulting in the secret bits originating from entity 2 and being shared with entity 1). Then, entity 2 can perform the steps outlined above for Alice, and entity 1 can perform the steps outlined above for Bob (resulting in the secret bits originating from entity 1 and being shared with entity 2). The entities may can continue in this alternating fashion, such that each entity has produced roughly half of the total number of shared bits. In this case, if Eve is only in the vicinity of one of the entities, she only recovers half of the secret bits. If a sufficient number of bits were produced by both of the entities, and the secret is (for example) the hash of both sets, then Eve has no hope of recovering the secret.

While in above examples, Alice and Bob broke their encoded vectors into two separate 4-component symbols of what appeared to be neighboring subcarriers; doing so may not always be necessary. First, Alice and Bob can choose to use any 4 subcarriers. Using 4 subcarriers that are not near each other can be desirable, because doing so increases the chance of higher variance between the channel coefficients, and thus increases the probability of getting a full rank channel matrix with large singular values, which is desirable. For example, Alice and/or Bob may make subcarriers 1, 11, 21, and 31 the subcarriers for a first SISO-implemented MOPRO exchange. Alice and/or Bob can then simultaneously use 2, 12, 22, and 32 as a second SISO implemented MOPRO exchange in parallel to the first SISO-implemented MOPRO. Alice and/or Bob can then use 3, 13, 23, and 33, etc.

Furthermore, in the above examples, both Alice and Bob split their transmissions into two separate 4-component symbols; doing so may not always be necessary. In some instances, subcarrier spacing can be chosen such that neighboring subcarriers have the same channel coefficient. In that case, all 8 components (e.g. from $\bar{t}_1$ and $\bar{t}_2$) could be sent simultaneously. Adding to the above example, instead of sending two consecutive 4 component transmissions in subcarriers 1, 11, 21, and 31, Alice (and Bob, when responding) can put symbol $\bar{t}_1$ in subcarriers 1, 11, 21, and 31, and put symbol $\bar{t}_2$ into 2, 12, 22, and 32.

In performing a MOPRO operation using a SISO system, one difference compared to performing an enhanced-MOPRO operation using a SISO system would have been that the matrix transmitted by Bob wouldn't have had the factor of $(G^\dagger A)^\dagger$ in the matrix. Therefore, the term $(G^\dagger A)^\dagger$ could be simply replaced by an identity term. As a result, Bob transmits matrix $B^*F_n b$ back to Alice. Alice then receives matrix:

$$A^*DF_n b.$$

Alice can remove the b, and the SVD will immediately give her $F_n$.

In any OFDM-like or UBDM-like system, assuming appropriate circularization by a cyclic prefix, the action of the channel is a single complex coefficient on each subcarrier value. In other words, a symbol of $(b_1, b_2, b_3, b_4, \ldots)$ will become $(h_1 b_1, h_2 b_2, h_3 b_3, h_4 b_4, \ldots)$. How much $h_i$ differs from $h_{i+1}$ and $h_{i-1}$ depends on the subcarrier spacing, which can be selected or modified. In more mathematical language, the channel will take the transmitted symbol $\bar{b}=(b_1, b_2, \ldots)$ and perform a 'Hadamard' product with the channel vector $\bar{h}=(h_1, h_2, \ldots)$. The Hadamard product is denoted $\bar{h} \circ \bar{b}$, and is defined as:

$$\bar{h} \circ \bar{b} = \bar{b} \circ \bar{h} = (h_1 b_1, h_2 b_2, h_3 b_3, \ldots).$$

In some instances, a method of performing MOPRO and/or enhanced-MOPRO using a SISO system includes starting with some collection of vectors $\bar{b}_i$ (for i in some indexing set) and applying some linear transformations to get a set of vectors $\bar{v}_i = M_i \bar{b}_i$ (where $M_i$ represents a set of linear operators). The method can further include arranging the components of the vectors $\bar{v}_i$ into a new set of vectors $\bar{V}_i$ so that the Hadamard action of the channel $\bar{h}$ on $\bar{V}_i$ produces output that the recipient can rearrange back into the form $H_i M_i \bar{b}_i$, where $H_i$ are matrices whose components depend in some way on the channel vector h.

Figure 4:
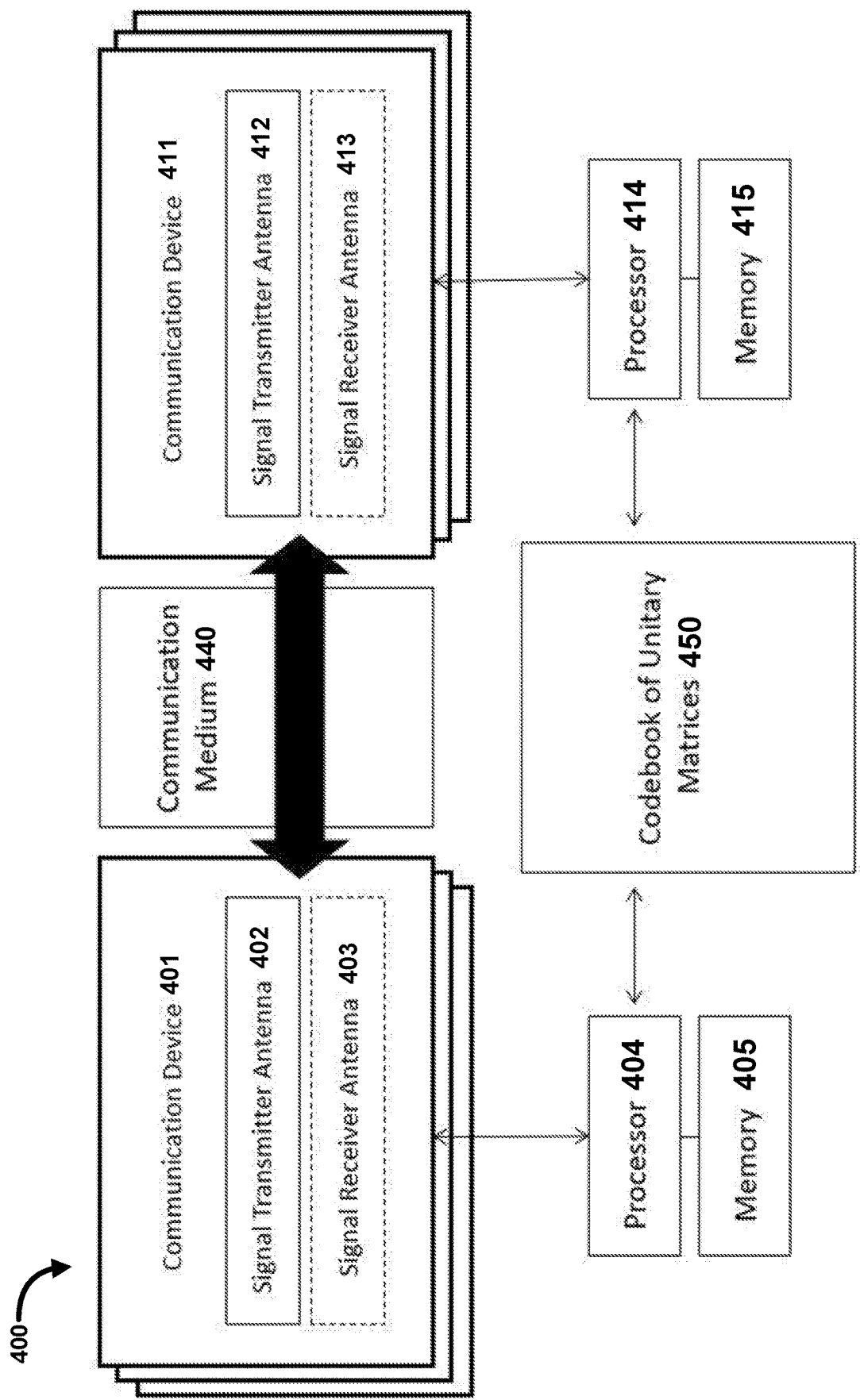
FIG. 4 is a schematic representation of a communication system using UBDM or OFDM with Single Input Single Output (SISO) implemented physical layer security (PLS), according to some embodiments.

FIG. 4 is a schematic representation of a PLS communication system using UBDM or OFDM with SISO-implemented physical layer security, capable of performing the SISO-implemented-MOPRO and enhanced-MOPRO processes described above, according to an embodiment. As shown in FIG. 4, the communication system 400 includes a first set of communication devices 401 and a second set of communication devices 411, communicably coupled to one another via a communication medium 440 (e.g., free space, a multipath wireless environment, etc.). The first set of communication devices 401 is communicably coupled to a first processor 404, and the second set of communication devices 411 is communicably coupled to a second processor 414. The first processor 404 is operably coupled to a memory 405 and the second processor 414 is operably coupled to a memory 415. Each of the first processor 404 and the second processor 414 is operably coupled to a storage repository storing a codebook of unitary matrices 450, which may be publicly-accessible. During operation of the PLS communication system 400, the processor 404 produces a first encoded vector and a second encoded vector and transmits the first encoded vector and second encoded vector to the second set of communication devices 411 via a communication channel of the communication medium 440. The communication channel applies a channel transformation to the first encoded vector and the second encoded vector during transmission, thereby producing a first transformed signal and a second transformed signal. The second processor 414 receives the first transformed signal and the second transformed signal, constructs a matrix from the first transformed signal and the second transformed signal, determines an effective channel representation/matrix thereof, and identifies left and right singular vectors of the effective channel. The second processor 414 selects a precoding matrix from the codebook of unitary matrices 450 based on a message, and produces a third encoded vector and a fourth encoded vector based on a second known vector, the precoding matrix, and a complex conjugate of the singular vectors. The second processor 414 then sends the second encoded vector to the first set of communication devices 401 for identification of the message. The first set of communication devices 401 can then receive, from the second set of communication devices 411 the third encoded vector and the fourth encoded vector. The processor 404 detects a representation of an effective channel based on the third encoded vector and the fourth encoded vector, and performs a singular value decomposition of the representation of the effective channel to identify a singular vector of the representation of the effective channel. The processor 404 then performs a query on the codebook of unitary matrices 450 to identify a message associated with the third encoded vector and the fourth encoded vector.

The methods and apparatus presented here are representative of many other possible methods and apparatus covering other temporal and/or spectral dimensions than can perform MOPRO and/or enhanced-MOPRO using a SISO system. In some embodiments, methods and apparatus to perform MOPRO and/or enhanced-MOPRO using a SISO system can cover temporal coherence and frequency/spectral coherence approach.

Figure 5:
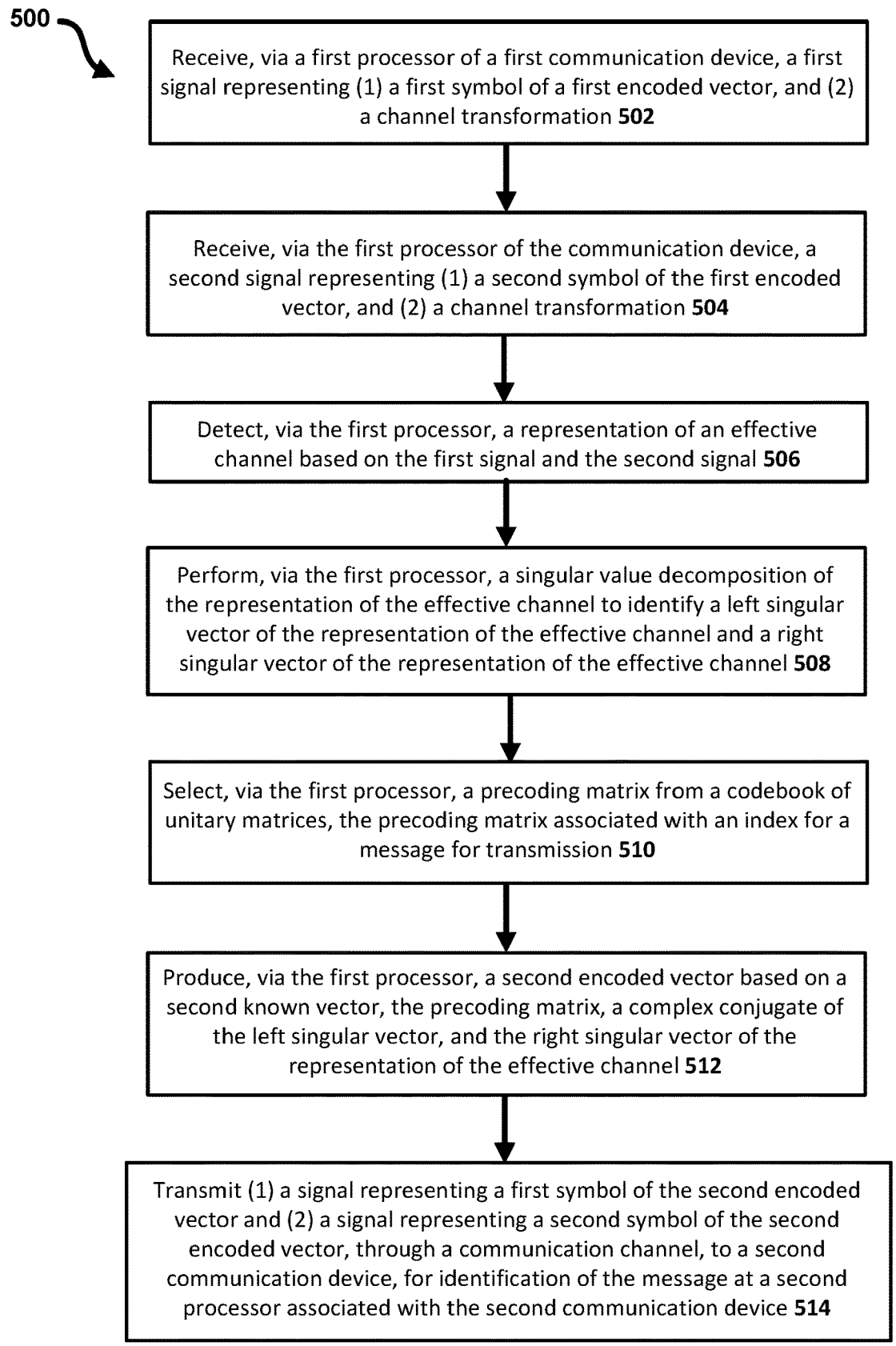
FIG. 5 is a flowchart illustrating a first method of performing UBDM or OFDM with SISO-implemented PLS, according to some embodiments.

FIG. 5 is a flowchart illustrating a first method 500 of performing UBDM or OFDM with SISO-implemented PLS, according to some embodiments. The method 500 can be implemented, for example, by the system 400 of FIG. 4, to perform the SISO-implemented-MOPRO and enhanced-MOPRO processes described above. As shown in FIG. 5, the method 500 includes receiving, at 502, via a first communication device (e.g., a communication device from the first set of communication devices 401 of FIG. 4) and at a first processor (e.g., processor 404 of FIG. 4), a first signal representing a first symbol of a first encoded vector and a channel transformation. The method 500 also includes receiving, at 504, via the first communication device and at the first processor, a second signal representing a second symbol of the first encoded vector and a channel transformation.

The first processor detects, at 506, a representation of an effective channel based on the first signal and the second signal, and performs, at 508, a singular value decomposition of the representation of the effective channel to identify a left singular vector of the representation of the effective channel and a right singular vector of the representation of the effective channel. The first processor selects, at 510, a precoding matrix from a codebook of unitary matrices (optionally, a publicly-accessible codebook). The precoding matrix is associated with an index for a message for transmission. The first processor produces, at 512, a second encoded vector based on a second known vector, the precoding matrix, a complex conjugate of the left singular vector, and the right singular vector of the representation of the effective channel. The method 500 also includes transmitting, at 514, (1) a signal representing a first symbol of the second encoded vector and (2) a signal representing a second symbol of the second encoded vector, through a communication channel, to a second communication device (e.g., communication device 411 of FIG. 4), for identification of the message at a second processor associated with the second communication device. The method 500 optionally also includes transmitting signals representing a plurality of additional encoded vectors through the communication channel to the second communication device until a predetermined number of messages have been sent.

In some implementations, producing the second encoded vector includes multiplying the complex conjugate of the left singular vector by the precoding matrix to produce an intermediate matrix, and multiplying the intermediate matrix by the right singular vector of the representation of the effective channel to produce the second encoded vector. Alternatively or in addition, the precoding matrix can be a first precoding matrix, the message can be a first message, and the index can be a first index, the method 500 further including selecting a second precoding matrix from the codebook of unitary matrices (the second precoding matrix associated with a second index for a second message for transmission), and producing a third encoded vector based on a third known vector, the second precoding matrix, a complex conjugate of the left singular vector, and the right singular vector of the representation of the effective channel. A signal representing the third encoded vector is then transmitted, through the communication channel, to the second communication device for identification of the second message.

Figure 6:
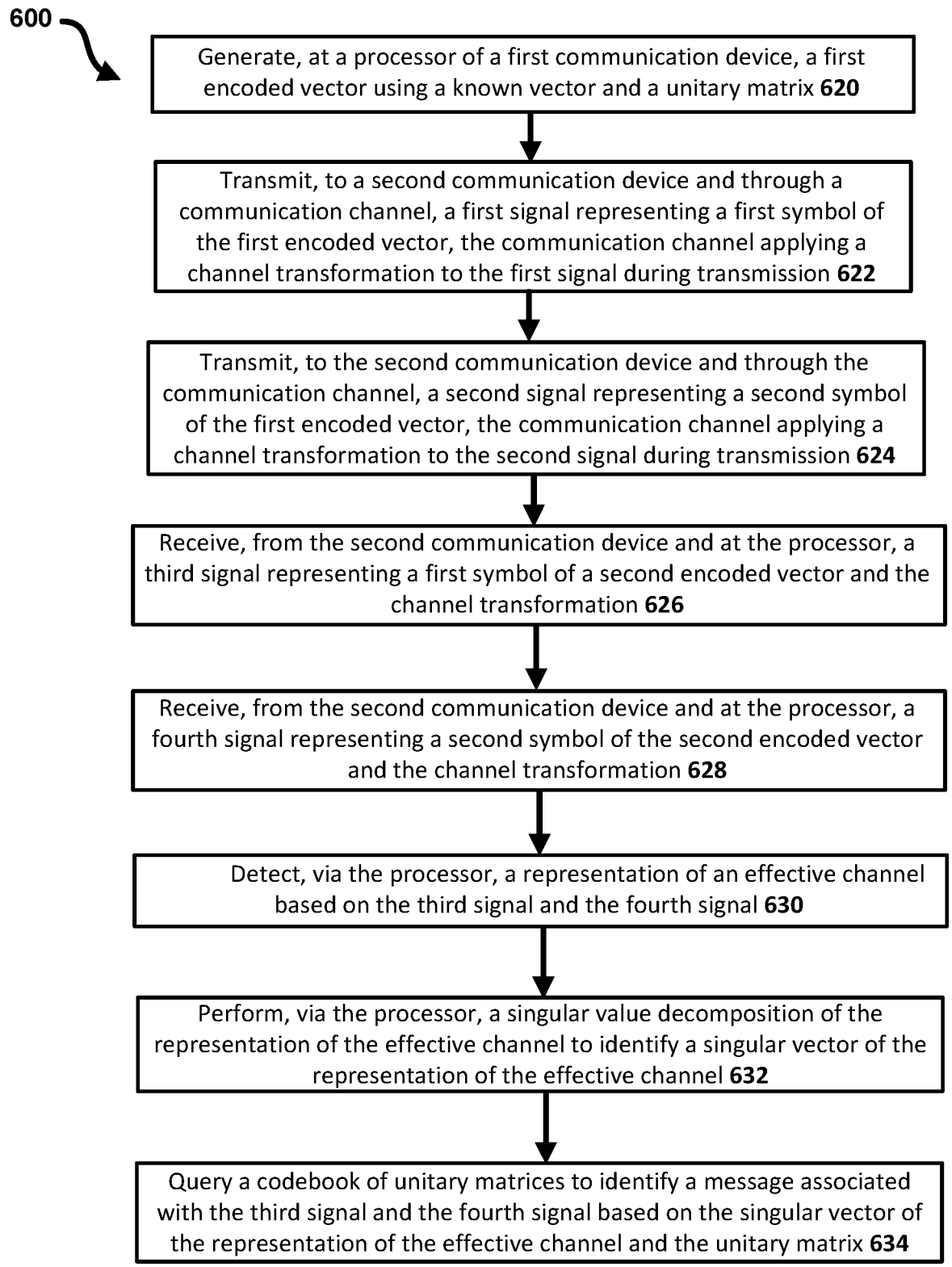
FIG. 6 is a flowchart illustrating a second method of performing UBDM or OFDM with SISO-implemented PLS, according to some embodiments.

FIG. 6 is a flowchart illustrating a second method of performing UBDM or OFDM with SISO-implemented PLS, according to some embodiments. The method 600 can be implemented, for example, by the system 400 of FIG. 4, to perform the SISO-implemented MOPRO and enhanced-MOPRO processes described above. As shown in FIG. 6, the method 600 includes generating, at 620, at a processor of a first communication device (e.g., a communication device from the first set of communication devices 401 of FIG. 4), a first encoded vector using a known vector and a unitary matrix. The method 600 also includes transmitting, at 622, to a second communication device (e.g., a communication device from the second set of communication devices 411 of FIG. 4) and through a communication channel, a first signal representing a first symbol of the first encoded vector. The communication channel applies a channel transformation to the first signal during transmission. The method 600 also includes transmitting, at 624, to the second communication device and through the communication channel, a second signal representing a second symbol of the first encoded vector. The communication channel also applies a channel transformation to the second signal during transmission. The processor receives, from the second communication device: (1) a third signal (at 626) representing a first symbol of a second encoded vector and the channel transformation, and (2) a fourth signal (at 628) representing a second symbol of the second encoded vector and the channel transformation.

The processor detects, at 630, a representation of an effective channel based on the third signal and the fourth signal, and performs, at 632, a singular value decomposition of the representation of the effective channel to identify a singular vector of the representation of the effective channel. The method 600 also includes querying a codebook of unitary matrices (the codebook optionally publicly-accessible), at 634, to identify a message associated with the third signal and the fourth signal based on the singular vector of the representation of the effective channel and the unitary matrix.

In some implementations, the method 600 also includes receiving, from the second communication device and at the processor, a plurality of additional signals representing a plurality of additional encoded vectors via the communication channel from the second communication device until a predetermined number of messages have been received. Alternatively or in addition, the method 600 also includes detecting, via the processor, a precoding matrix associated with an index for the message, with the querying of the codebook of unitary matrices being based on the precoding matrix.

FIG. 7A is a flowchart of a method 700A of preparing, producing, and transmitting a signal using a first communication device (such as the signal transmitter 201 shown and described with respect to FIG. 2) in a secure and efficient manner using a UBDM system, according to an embodiment. As shown in FIG. 7A, the method 700A includes, at step 701A, producing, via at least one processor operatively to a first communication device, a first encoded vector, using a first known vector and a unitary matrix. The method 700A further includes, at step 702A, transmitting a signal representing a first symbol of the first encoded vector to a second communication device, through a communication channel that applies a channel transformation to the first symbol during transmission to produce a first transformed symbol. The method 700A further includes, at step 703A, transmitting a signal representing a second symbol of the first encoded vector to the second communication device, through a communication channel that applies the channel transformation to the second symbol during transmission to produce a second transformed symbol.

In some embodiments, the first communication device receives data that represent an original signal to be transmitted in a secure and efficient manner. The data can also represent attributes associated with the signal such as, for example, information related to the nature of the signal, the nature of the input bits, the size, sensitivity of the information contained, security requirements, etc. In some instances, the signal transmitter can generate a plurality of symbols, with a symbol being described as a pulse in a digital complex baseband signal. In some implementations, a symbol can be a waveform, or a state that, when transmitted through a communication channel defined in a communications network, can change/alter and/or maintain a state or a significant condition of the communication channel such that the state or condition persists, for a fixed period of time. In some instances, the first communication device can break up the data into a plurality of symbols that can be modified and/or transmitted in parallel using a SISO system of transmission and a MIMO system of transmission as described further below. In some instances, a signal transmitter can use a converter (e.g., converter 214) to convert a parallel data to a serial data. In some other instances, a signal transmitter can use the converter to convert a serial data into a parallel data. In some implementations, the generating a plurality of symbols based on the data can be via using a bit-to-symbol map.

In some embodiments, the first communication device produces a serial plurality of symbols associated with a serial signal and breaks the serial plurality of symbols up into pluralities of blocks, each plurality of blocks representing a vector from a plurality of vectors, the vectors being configured to be encoded and/or transmitted in series using a SISO system of transmission as described herein. In some instances, a signal transmitter can use a converter (e.g., converter 214 of FIG. 2) to convert a parallel plurality of symbols into a serial plurality of blocks.

In some implementations, the first communication device selects, based at least partially on the plurality of vectors, an arbitrary transformation configured to be applied to the vectors to generate a plurality of encoded vectors. For example, the signal transmitter can have access to a library of known arbitrary transformations including unitary transformations, equiangular tight frame (ETF) transformations, and a nearly equiangular tight frame (NETF) transformations. The signal transmitter can use an arbitrary transformation selector (e.g., arbitrary transformation selector 215 shown and describe with respect to FIG. 2) to select the arbitrary transformation, for example a unitary transformation, to be applied on the plurality of vectors to generate a plurality of encoded vectors. In some instances, the arbitrary transformation can select an equiangular tight frame (ETF) transformation, or in some other instances the arbitrary transformation selector can select a nearly equiangular tight frame (NETF) transformation. In some implementations, the arbitrary transformation selector can be configured such that the arbitrary transformation selected is based on a matrix that is not an identity matrix or a discrete Fourier matrix. In some implementations, the arbitrary transformation selector can be configured such that the arbitrary transformation selected is based on a matrix that is not a direct sum of discrete Fourier matrices. The first communication device applies the arbitrary transformation to each vector of the plurality of vectors to produce the plurality of encoded vectors. In some instances, applying the arbitrary transformation can be such that the plurality of encoded vectors have a total magnitude that substantially equals a total magnitude of the plurality of vectors.

In some implementations, the first communication device transmits (e.g., at 702A) a signal representing a first symbol of a first encoded vector from the plurality of encoded vectors to the second communication device (such as the signal receiver 301 shown and described with respect to FIG. 3), through a communication channel that applies a channel transformation to the first symbol during transmission to produce a first transformed symbol. In some instances, the first communication device sends a signal representing the first symbol of the first encoded vector to at least one transmitter antenna for transmission of a signal representing the first encoded vector from the at least one antenna to the second communication device. In some instances, the plurality of encoded vectors can be configured to be sent in series via at least one transmitter antenna associated with the first communication device (e.g., signal transmitter antenna 217 associated with the signal transmitter 201 shown and described with respect to FIG. 2) and through at least one communication channel using a such that the first encoded vector is sent in series can be received by at least one receiver associated with the UBDM system being used. For example, the at least one receiver can include at least one antenna, and the at least one receiver be associated with the second communication device (e.g., the signal receiver 301) and the at least one transmitter antenna can be associated with the first communication device (e.g., the signal transmitter 201), where in the first communication device and the second communication device are configured to perform Single Input Single Output (MIMO) operations.

In some implementations, the first communication device transmits (e.g., at 703A) a signal representing a second symbol of the first encoded vector to the second communication device (such as the signal receiver 301 shown and described with respect to FIG. 3), through the communication channel that applies the channel transformation to the second symbol during transmission to produce the second transformed symbol. In some instances, the first communication device sends a signal representing the second symbol of the first encoded vector to at least one transmitter antenna for transmission of a signal representing the first encoded vector from the at least one antenna to the second communication device. In some instances, the plurality of encoded vectors can be configured to be sent in series via at least one transmitter antenna associated with the first communication device (e.g., signal transmitter antenna 217 associated with the signal transmitter 201 shown and described with respect to FIG. 2) and through at least one communication channel using a such that the first encoded vector sent in series can be received by at least one receiver associated with the UBDM system being used. For example, the at least one receiver can include at least one antenna, and the at least one receiver be associated with the second communication device (e.g., the signal receiver 301) and the at least one transmitter antenna can be associated with the first communication device (e.g., the signal transmitter 201), where in the first communication device and the second communication device are configured to perform SISO operations.

In some implementations, the signal includes a set of transformed symbols associated with the first encoded vector and the first communication device (e.g., signal transmitter 201) can place a set of transformed symbols on the communication channel(s) (e.g., via a signal transmitter antenna 217) at a fixed and known symbol rate. The second communication device (e.g., signal receiver 301) can perform the task of detecting the sequence of transformed symbols to reconstruct the first encoded vector.

In some implementations, the first communication device can be configured to send the signal representing the first encoded vectors to the plurality of transmitters via a physical layer associated with an open system interconnection model (OSI). The OSI model is a conceptual model that characterizes and standardizes the communication functions of a telecommunication or computing system without regard to its underlying internal structure and technology with the goal of achieving interoperability of diverse communication systems using standard communication protocols. The OSI model uses partitioning of information exchanged via communication channels of a communication network into abstraction layers (e.g., seven layers) with each layer including information of a specific type.

For example, a layer can include a physical layer used for the transmission and reception of unstructured raw data between a signal transmitter and a physical transmission medium (e.g., a wireless communication channel in a communication network such as communication network 106 as shown and describe with respect to FIG. 1). It is configured to convert data included in the signals transmitted into electrical, radio, or optical signals. Layer specifications define characteristics such as voltage levels, the timing of voltage changes, physical data rates, maximum transmission distances, modulation scheme, channel access method and physical connectors. This includes the layout of pins, voltages, line impedance, cable specifications, signal timing and frequency for wireless devices. Bit rate control is done at the physical layer and may define transmission mode as simplex, half duplex, and full duplex. The components of a physical layer can be described in terms of a network topology. The communications channel used to transmit the signal can have specifications for a physical layer.

In some instances, a first arbitrary transformation is used to produce the first encoded vector and a second arbitrary transformation is used to produce the second encoded vector. Providing a signal representing the first arbitrary transformation and/or the second arbitrary transformation can include providing a first signal representing the first arbitrary transformation and providing a second signal representing the second arbitrary transformation. In some implementations, the transmitting the first transformed signal and the providing the first signal representing the first arbitrary transformation can be to a first receiver associated with a first receiver, and the transmitting the second transformed signal produced using the second arbitrary transformation and the providing the second signal representing the second arbitrary transformation can be to a second receiver antenna associated with a second receiver different from the first receiver. In some instances, the first and second signals representing the first arbitrary transformation and the second arbitrary transformations can be broadcast together to a wide audience including the first and second signal receivers. In some instances the first signal representing the arbitrary transformation can be broadcast widely but not the second signal representing the arbitrary transformation, such that the first signal receiver is able to recover the first encoded vector but the second receiver is unable to recover the second encoded vector until the second signal representing the second arbitrary transformation is provided or broadcast.

To generate a maximal set of mutually orthogonal spreading codes, a unitary matrix A∈U(N) is chosen. If the $n^{th}$ column is denoted (or row, doesn't matter which as long as there is consistency) of A as $\overline{A}_n$, then the N codes are $\overline{c}(\overline{A}_n)$ for n∈[1, . . . , N]. If one device is to transmit data on all N codes, then it will be able to take the N symbols $b_n$, multiply each symbol by every component of its spreading code, and then add the resulting vectors together. So the transmitted vector $\bar{s}$ is:

$$\bar{s} = \sum_{n=1}^{N} b_n \overline{c}(\overline{A}_n),$$

where $b_n$ are the symbols.

The transmitter multiplies a symbol $b_n$ ∈C which is typically a complex number (a float, double, etc), times all M≈N components of $\overline{c}(\overline{A}_n)$. This is repeated for all N symbols $b_n$. So, there are N symbols, each being multiplied by N components of the code. This makes the complexity $O(N^2)$, which is prohibitive for wide-band applications and is larger compared to complexity of OFDM, which has a complexity of O(N log N).

Notably for multiple access applications, where each user is given a subset of the codes, multiple access applications only have to do O(N) work, which is better than OFDM. That makes the DSSS implementation a suitable option for multiple access applications.

To obtain a UBDM that has a complexity in the order of O(N log N), to match OFDM reinterpret. The transmitted baud is $$[\bar{s}]_m = \sum_{n=1}^{N} b_n [\overline{c}(\overline{A}_n)]_m$$

$$= \sum_{n=1}^{N} b_n \sum_{k=1}^{N} A_{nk} e^{-2\pi i \kappa_k \left(\frac{m}{M}-\frac{1}{2}\right)}$$

$$= \sum_{k=1}^{N} \left(\sum_{n=1}^{N} b_n A_{nk}\right) e^{-2\pi i \kappa_k \left(\frac{m}{M}-\frac{1}{2}\right)}$$

$$= \sum_{k=1}^{N} \tilde{b}_k e^{-2\pi i \kappa_k \left(\frac{m}{M}-\frac{1}{2}\right)}.$$

This can be interpreted (up to normalization) as a discrete Fourier transform of the symbols:

$$\tilde{b}_k \equiv \sum_{n=1}^{N} b_n A_{nk}.$$

Figure 7B:
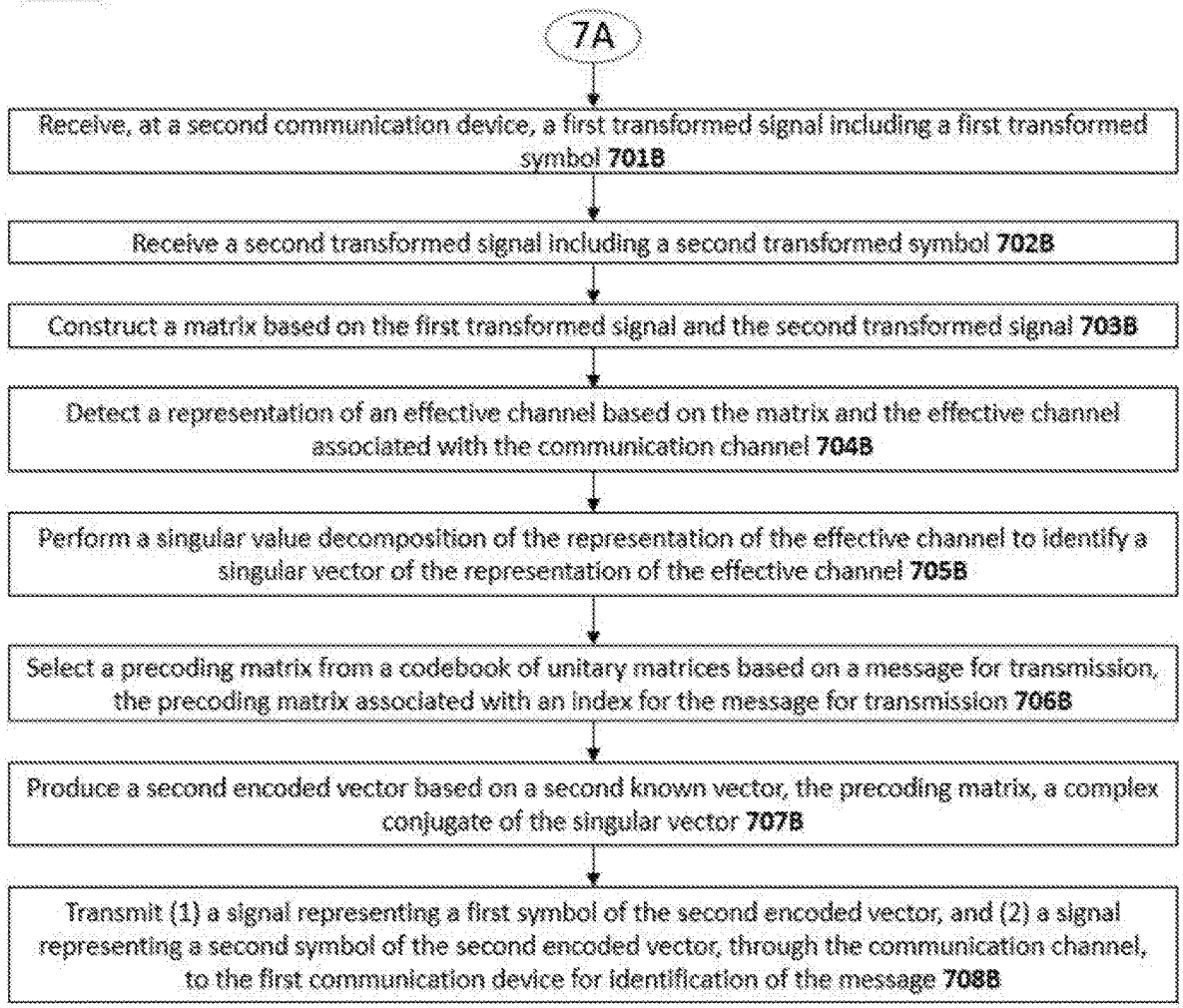
FIG. 7B is a flowchart illustrating a method of operating a UBDM system, according to an embodiment.

FIG. 7B illustrates a flowchart describing a method 700B, continued from method 700A of FIG. 7A, of receiving a first set of signals, retrieving information from the first set of signals, and transmitting a second set of signal using a second communication device (such as the signal receiver 301 shown and describe with respect to FIG. 3) in a secure and efficient manner using a UBDM system, according to an embodiment. The method 700B can be implemented by a processor associated with the second communication device (e.g., signal receiver 301). As shown in FIG. 7B, the method 700B includes, at step 701B, receiving, at a second communication device, a first transformed signal including a first transformed symbol. The method 700B further includes, at step 702B, receiving a second transformed signal including a second transformed symbol. The method 700B further includes, at step 703B, constructing a matrix based on the first transformed signal and the second transformed signal. The method 700B further includes, at step 704B, detecting a representation of an effective channel based on the matrix, the effective channel associated with the communication channel. The method 700B further includes, at step 705B, performing a singular value decomposition of the representation of the effective channel to identify a singular vector of the representation of the effective channel. The method 700B further includes, at step 706B, selecting a precoding matrix from a codebook of unitary matrices based on a message for transmission, the precoding matrix associated with an index for the message for transmission. The method 700B further includes, at step 707B, producing a second encoded vector based on a second known vector, the precoding matrix, a complex conjugate of the singular vector. The method 700B further includes, at step 708B, transmitting (1) a signal representing a first symbol of the second encoded vector, and (2) a signal representing a second symbol of the second encoded vector, through the communication channel, to the first communication device for identification of the message. The method 700B is explained in greater detail below.

In some implementations, the second communication device receives (e.g., at 701B) the first transformed signal including a first transformed symbol. The second communication device can include at least one receiver antenna (e.g., the signal receiver antenna 317 as shown and described with respect to FIG. 3.) In some instances, the second communication device receives the first transformed signal representing the first symbol of the first encoded vector from the at least one receiver antenna for reception of a signal representing the first encoded vector from the at least one antenna from the first communication device. In some instances, a plurality of encoded vectors can be configured to be received in series via the at least one receiver antenna associated with the second communication device (e.g., signal receiver antenna 317 associated with the signal receiver 301 shown and described with respect to FIG. 3) and through at least one communication channel. For example, the at least one receiver can include at least one antenna, and the at least one receiver can be associated with the second communication device (e.g., the signal receiver 301) and the at least one transmitter antenna can be associated with the first communication device (e.g., the signal transmitter 201), where in the first communication device and the second communication device are configured to perform SISO operations.

In some embodiments, the second communication device receives (e.g., at 702B) the second transformed signal including a second transformed symbol. In some instances, the second communication device receives the second transformed signal representing the second symbol of the first encoded vector from the at least one receiver antenna for reception of a signal representing the first encoded vector from the at least one antenna from the first communication device. In some instances, a plurality of encoded vectors can be configured to be received in series via the at least one receiver antenna associated with the second communication device and through at least one communication channel. For example, the at least one receiver can include at least one antenna, and the at least one receiver can be associated with the second communication device (e.g., the signal receiver 301) and the at least one transmitter antenna can be associated with the first communication device (e.g., the signal transmitter 201), where in the first communication device and the second communication device are configured to perform SISO operations.

In some implementations, the second communication device constructs (e.g., at 703B) a matrix based on the first transformed symbol of the first transformed signal and the second transformed symbol of the second transformed signal. In some instances, the second communication device constructs the matrix by arranging elements of the first transformed symbol and the second transformed symbol to a matrix with at least two rows and two columns. The second communication device decomposes the matrix to at least a symbol matrix and a communication channel matrix. At 404B, the second communication device detects a representation of an effective channel based on the matrix and the effective channel associated with the communication channel.

In some implementations, the second communication device performs a singular value decomposition (e.g., at 705B) of the representation of the effective channel to identify a singular vector of the representation of the effective channel. In one example, the singular value decomposition can be a factorization of a real or complex matrix, such as, for example, a factorization of the representation of the effective channel. At 706B, the second communication device selects a precoding matrix from a codebook of unitary matrices based on a message for transmission, the precoding matrix associated with an index for the message for transmission. The precoding matrix can be selected from a codebook of unitary matrices that may or may not be publicly available.

In some implementations, the second communication device produces a second encoded vector (e.g., at 707B) based on a second known vector, the precoding matrix, a complex conjugate of the singular vector. At 708B, the second communication device transmits (1) a signal representing a first symbol of the second encoded vector, and (2) a signal representing a second symbol of the second encoded vector, through the communication channel, to the first communication device for identification of the message. The communication channel can have a channel vector h that transforms the encoded vector to a transformed symbol of the second encoded vector.

Figure 8A:
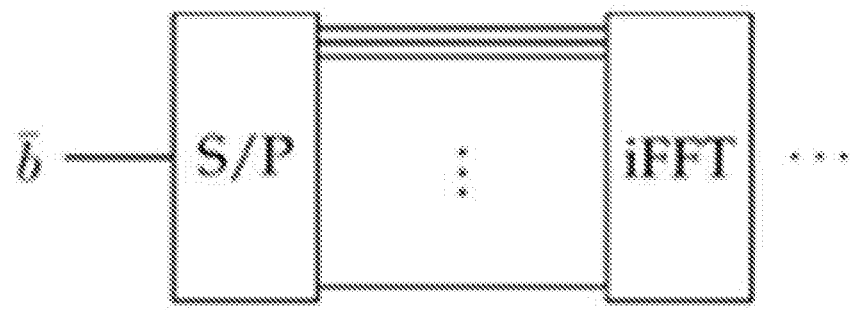
FIG. 8A is a schematic representation of a processing of a signal at a signal transmitter of an OFDM system.

In some embodiments, the UBDM system (e.g., UBDM system 100) can be in some aspects partly similar in structure and/or function to an Orthogonal Frequency Divisional Multiplexing (OFDM) system. For example, an example pipeline for an OFDM system 800A can include a set of operations as presented in FIG. 8A, where vector b can be a set of symbols $b_n$.

Figure 8B:
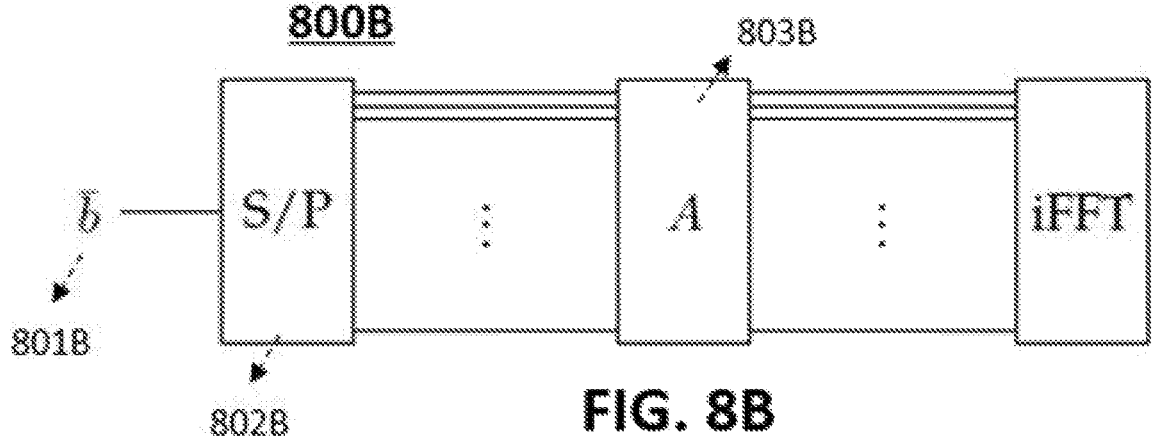
FIG. 8B is a schematic representation of a processing of a signal at a signal transmitter of a UBDM system, according to an embodiment.

Compared to the above described OFDM system 800A, operations carried out by a UBDM system 800B described herein (e.g., UBDM system 100) are illustrated in FIG. 8B. The UBDM 800B can include an extra operator (e.g., a linear operator) 'A' between the S/P block 802B and the iFFT block, as shown in FIG. 8B. In use, according to the example embodiment associated with FIG. 8B, the UBDM 800B operates such that symbols $b_n$ are received by the signal transmitter and are first put through a serial-to-parallel block (e.g., converter similar to converter 214 of the signal transmitter 201) to generate a converted set of vectors. The converted set of vectors then undergo the linear transformation A to generate a set of transformed vectors. For example, the transformation can be carried out by an arbitrary transformation applier 803B similar to arbitrary transformation applier 216 and the linear transformation A being selected by arbitrary transformation selector similar to the arbitrary transformation selector 215. In some embodiments, the transformed vectors are then put through an iFFT block to generate a second transformed vectors and the resulting second transformed vectors can be transmitted to one or more receivers in the UBDM system.

In some other embodiments, the iFFT block can be skipped and the transformed vectors generated by the arbitrary transformation applier can be transmitted to one or more receivers in the UBDM system. Expressed in another way, $$\vec{b} \to A\vec{b} \to \vec{s} = \mathcal{F} A\vec{b}$$

Figure 8C:
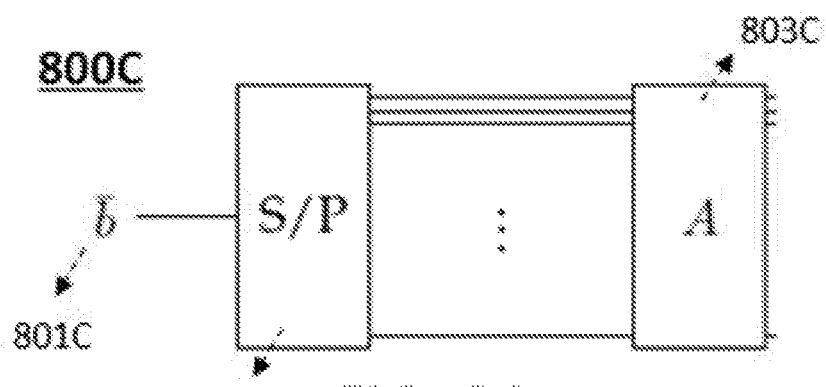
FIG. 8C is a schematic representation of a processing of a signal at a signal transmitter of a UBDM system, according to an embodiment.

(where $\mathcal{F}$ is the discrete Fourier matrix). In some embodiments, A can be unitary by design, as described herein, and $\mathcal{F}$ is known to be unitary. By property of unitary matrices as a group, the product $\mathcal{F}$ A will also be unitary. Therefore, because A can be any unitary, including the iFFT matrix is unnecessary, and according to some embodiments a UBDM system can be configured by replacing the iFFT block with an arbitrary unitary A, as illustrated in FIG. 8C showing the operations in a UBDM system 800C, including an arbitrary transform applier 803C, according to an embodiment.

Following the above description a signal transmitter and a signal receiver operable with an OFDM system (e.g., OFDM system 800A of FIG. 8A) can be easily adapted to be used with a UBDM system described herein with the replacement of an iFFT operation with an arbitrary transformation operation using A at the transmitter and the FFT with a linear operation A' at the signal receiver to reverse the transformation. Other details of an OFDM system can remain.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
a first communication device having access to a codebook of unitary matrices;
a second communication device having access to the codebook of unitary matrices;
at least one processor operatively coupled to the first communication device, the at least one processor for the first communication device configured to:
produce a first encoded vector, using a first known vector and a unitary matrix, and
transmit a signal representing a first symbol of the first encoded vector to the second communication device, through a communication channel that applies a channel transformation to the first symbol during transmission to produce a first transformed symbol, and
transmit a signal representing a second symbol of the first encoded vector to the second communication device, through a communication channel that applies a channel transformation to the second symbol during transmission to produce a second transformed symbol; and
at least one processor operatively coupled to the second communication device, the at least one processor for the second communication device configured to:
receive a first transformed signal including the first transformed symbol,
receive a second transformed signal including the second transformed symbol,
construct a matrix based on the first transformed signal and the second transformed signal,
detect a representation of an effective channel based on the matrix, the effective channel associated with the communication channel,
perform a singular value decomposition of the representation of the effective channel to identify a singular vector of the representation of the effective channel,
select a precoding matrix from the codebook of unitary matrices based on a message for transmission, the precoding matrix associated with an index for the message for transmission,
produce a second encoded vector based on a second known vector, the precoding matrix, a complex conjugate of the singular vector, and
transmit (1) a signal representing a first symbol of the second encoded vector, and (2) a signal representing a second symbol of the second encoded vector, through the communication channel, to the first communication device for identification of the message.

2. The system of claim 1, wherein the at least one processor operatively coupled to the second communication device is configured to produce the second encoded vector by:
multiplying the complex conjugate of the singular vector by the precoding matrix to produce an intermediate matrix; and
multiplying the intermediate matrix by training values to produce the second encoded vector.

3. The system of claim 1, wherein the codebook of unitary matrices is publicly-accessible.

4. The system of claim 1, wherein the precoding matrix is a first precoding matrix, the message is a first message, and the index is a first index, the at least one processor operatively coupled to the second communication device is further configured to:
select a second precoding matrix from the codebook of unitary matrices, the second precoding matrix associated with a second index for a second message for transmission, produce a third encoded vector based on a third known vector, the second precoding matrix, and a complex conjugate of the singular vector, and
transmit (1) a signal representing a first symbol of the third encoded vector, and (2) a signal representing a second symbol of the third encoded vector, through the communication channel, to the first communication device for identification of the second message.

5. The system of claim 1, wherein the at least one processor operatively coupled to the second communication device is further configured to transmit signals representing a plurality of additional encoded vectors through the communication channel to the first communication device until a predetermined number of messages have been sent.

6. A system, comprising:
a first communication device having access to a codebook of unitary matrices;
a second communication device having access to the codebook of unitary matrices;
at least one processor operatively coupled to the first communication device, the at least one processor for the first communication device configured to:
produce a first encoded vector, using a first known vector and a unitary matrix, and
transmit a signal representing a first symbol of the first encoded vector to the second communication device, through a communication channel, the communication channel applying a channel transformation to the first symbol during transmission, and
transmit a signal representing a second symbol of the first encoded vector to the second communication device, through a communication channel, the communication channel applying a channel transformation to the second symbol during transmission; and
at least one processor operatively coupled to the second communication device, the at least one processor for the second communication device configured to:
receive a first transformed signal including a version of the first symbol that has been transformed by the channel transformation,
receive a second transformed signal including a version of the second symbol that has been transformed by the channel transformation,
construct a matrix based on the first transformed signal and the second transformed signal,
detect a representation of an effective channel based on the matrix, the effective channel associated with the communication channel,
perform a singular value decomposition of the representation of the effective channel to identify a left singular vector of the representation of the effective channel and a right singular vector of the representation of the effective channel,
select a precoding matrix from the codebook of unitary matrices based on a message for transmission, the precoding matrix associated with an index for the message for transmission,
produce a second encoded vector based on a second known vector, the precoding matrix, a complex conjugate of the left singular vector, and the right singular vector of the representation of the effective channel, and transmit (1) a signal representing a first symbol of the second encoded vector, and (2) a signal representing a second symbol of the second encoded vector, through the communication channel, to the first communication device for identification of the message.

7. The system of claim 6, wherein the at least one processor operatively coupled to the second communication device is configured to produce the second encoded vector by:

multiplying the complex conjugate of the left singular vector by the precoding matrix to produce an intermediate matrix; and multiplying the intermediate matrix by the right singular vector of the representation of the effective channel to produce the second encoded vector.

8. The system of claim 6, wherein the codebook of unitary matrices is publicly-accessible.

9. The system of claim 6, wherein the precoding matrix is a first precoding matrix, the message is a first message, and the index is a first index, the at least one processor operatively coupled to the second communication device is further configured to:

select a second precoding matrix from the codebook of unitary matrices, the second precoding matrix associated with a second index for a second message for transmission, produce a third encoded vector based on a third known vector, the second precoding matrix, a complex conjugate of the left singular vector, and the right singular vector of the representation of the effective channel, and transmit (1) a signal representing a first symbol of the third encoded vector, and (2) a signal representing a second symbol of the third encoded vector, through the communication channel, to the first communication device for identification of the second message.

10. The system of claim 6, wherein the at least one processor operatively coupled to the second communication device is further configured to transmit signals representing a plurality of additional encoded vectors through the communication channel to the first communication device until a predetermined number of messages have been sent.

11. The system of claim 6, wherein:

the at least one processor operatively coupled to the first communication device is further configured to:

receive a third transformed signal including a version of the first symbol of the second encoded vector that has been transformed by the channel transformation; and receive a fourth transformed signal including a version of the second symbol of the second encoded vector that has been transformed by the channel transformation, identification of the message includes removing a representation of the right singular vector of the representation of the effective channel from each of the third transformed signal and the fourth transformed signal.

12. A method, comprising:

receiving, via a first communication device and at a first processor, a first signal representing a first symbol of a first encoded vector and a channel transformation;

receiving, via the first communication device and at the first processor, a second signal representing a second symbol of the first encoded vector and a channel transformation;

detecting, via the first processor, a representation of an effective channel based on the first signal and the second signal;

performing, via the first processor, a singular value decomposition of the representation of the effective channel to identify a left singular vector of the representation of the effective channel and a right singular vector of the representation of the effective channel;

selecting, via the first processor, a precoding matrix from a codebook of unitary matrices, the precoding matrix associated with an index for a message for transmission;

producing, via the first processor, a second encoded vector based on a second known vector, the precoding matrix, a complex conjugate of the left singular vector, and the right singular vector of the representation of the effective channel; and transmitting (1) a signal representing a first symbol of the second encoded vector and (2) a signal representing a second symbol of the second encoded vector, through a communication channel, to a second communication device, for identification of the message at a second processor associated with the second communication device.

13. The method of claim 12, wherein producing the second encoded vector includes:

multiplying the complex conjugate of the left singular vector by the precoding matrix to produce an intermediate matrix; and multiplying the intermediate matrix by the right singular vector of the representation of the effective channel to produce the second encoded vector.

14. The method of claim 12, wherein the codebook of unitary matrices is publicly-accessible.

15. The method of claim 12, wherein the precoding matrix is a first precoding matrix, the message is a first message, and the index is a first index, the method further comprising:

selecting a second precoding matrix from the codebook of unitary matrices, the second precoding matrix associated with a second index for a second message for transmission, producing a third encoded vector based on a third known vector, the second precoding matrix, a complex conjugate of the left singular vector, and the right singular vector of the representation of the effective channel, and transmitting a signal representing the third encoded vector, through the communication channel, to the second communication device for identification of the second message.

16. The method of claim 12, further comprising transmitting signals representing a plurality of additional encoded vectors through the communication channel to the second communication device until a predetermined number of messages have been sent.

17. A method, comprising:

generating, at a processor of a first communication device, a first encoded vector using a known vector and a unitary matrix;

transmitting, to a second communication device and through a communication channel, a first signal representing a first symbol of the first encoded vector, the communication channel applying a channel transformation to the first signal during transmission;

transmitting, to the second communication device and through the communication channel, a second signal representing a second symbol of the first encoded vector, the communication channel applying a channel transformation to the second signal during transmission;

receiving, from the second communication device and at the processor, a third signal representing a first symbol of a second encoded vector and the channel transformation;

receiving, from the second communication device and at the processor, a fourth signal representing a second symbol of the second encoded vector and the channel transformation;

detecting, via the processor, a representation of an effective channel based on the third signal and the fourth signal;

performing, via the processor, a singular value decomposition of the representation of the effective channel to identify a singular vector of the representation of the effective channel; and querying a codebook of unitary matrices to identify a message associated with the third signal and the fourth signal based on the singular vector of the representation of the effective channel and the unitary matrix.

18. The method of claim 17, wherein the codebook of unitary matrices is publicly-accessible.

19. The method of claim 17, further comprising receiving, from the second communication device and at the processor, a plurality of additional signals representing a plurality of additional encoded vectors via the communication channel from the second communication device until a predetermined number of messages have been received.

20. The method of claim 17, further comprising:
detecting, via the processor, a precoding matrix associated with an index for the message,
the querying of the codebook of unitary matrices being based on the precoding matrix.

* * * * *